(12) United States Patent
Takeuchi

(10) Patent No.: US 12,427,869 B2
(45) Date of Patent: Sep. 30, 2025

(54) MOWER

(71) Applicant: UNIQ INC., Tokyo (JP)

(72) Inventor: Mikio Takeuchi, Tokyo (JP)

(73) Assignee: UNIQ INC., Tokyo (JP)

(*) Notice: Subject to any disclaimer, the term of this patent is extended or adjusted under 35 U.S.C. 154(b) by 404 days.

(21) Appl. No.: 18/031,569

(22) PCT Filed: Nov. 9, 2021

(86) PCT No.: PCT/JP2021/041192
§ 371 (c)(1),
(2) Date: Apr. 12, 2023

(87) PCT Pub. No.: WO2022/102615
PCT Pub. Date: May 19, 2022

(65) Prior Publication Data
US 2023/0373318 A1    Nov. 23, 2023

(30) Foreign Application Priority Data

Nov. 11, 2020 (JP) .................................. 2020-188355

(51) Int. Cl.
*B60L 15/20* (2006.01)
*A01D 34/00* (2006.01)
(Continued)

(52) U.S. Cl.
CPC ........ *B60L 15/2045* (2013.01); *A01D 34/006* (2013.01); *A01D 34/78* (2013.01);
(Continued)

(58) Field of Classification Search
CPC .. A01D 34/006; A01D 34/78; A01D 2101/00; A01D 69/02; B60L 15/2045
See application file for complete search history.

(56) References Cited

U.S. PATENT DOCUMENTS 5,937,622 A     8/1999  Carrier
11,194,336 B2 * 12/2021 Uemoto ................. G06V 20/10
(Continued)

OTHER PUBLICATIONS

International Search Report and Written Opinion issued in corresponding Application No. PCT/JP2021/041192 on Jan. 25, 2022; 8 pages.

*Primary Examiner* — Kristen C Hayes
(74) *Attorney, Agent, or Firm* — Studebaker Brackett PLLC

(57) ABSTRACT

Provided is a mower that makes it possible to predict a consumption rate of its battery, a change in the remaining capacity of the battery, the workable time from the state in which the battery is fully charged, and the time when to replace the battery. In a mower 10 equipped with a mowing motor 70 and travel drive motors 20A, 20B, a target rotation speed of the mowing motor 70 and power consumption that are set and input by a user are accepted, and while the set target rotation speed of the mowing motor 70 is maintained, an actual power usage value that varies according to variation in load to the mowing motor 70 accompanying an increase or a decrease in the amount of grass is found, using a battery current measured by a current sensor 132, and a new target rotation speed of the travel drive motors 20A, 20B is calculated from a difference between the found actual power usage value and a set value of the power consumption, whereby a travel speed is controlled such that the actual power usage value falls within the range of the set value of the power consumption.

7 Claims, 11 Drawing Sheets

(51) Int. Cl.
*A01D 34/78* (2006.01)
*A01D 101/00* (2006.01)
*B60L 1/00* (2006.01)

(52) U.S. Cl.
CPC .......... *B60L 1/003* (2013.01); *A01D 2101/00* (2013.01); *B60L 2240/421* (2013.01); *B60L 2240/549* (2013.01)

(56) References Cited

U.S. PATENT DOCUMENTS

| | | | |
|---|---|---|---|
| 11,712,000 B2* | 8/2023 | Yamagishi | A01B 63/12 56/10.2 R |
| 2012/0227368 A1* | 9/2012 | Koike | A01D 69/02 56/10.2 A |
| 2014/0062352 A1 | 3/2014 | Wang et al. | |
| 2015/0105904 A1* | 4/2015 | Mou | B60L 15/2036 901/1 |
| 2018/0146616 A1* | 5/2018 | Fukano | A01D 34/69 |
| 2019/0179326 A1* | 6/2019 | Uemoto | G06V 20/10 |
| 2021/0169000 A1 | 6/2021 | Yamagishi et al. | |

* cited by examiner

MOWER

TECHNICAL FIELD

The present invention relates to a mower equipped with a mowing motor for rotating mowing blades and a travel drive motor for self-propelling, and is usable when, for example, grass growing on various grounds such as slopes and rough grounds is mowed.

BACKGROUND ART

Normally, in a self-propelled mower equipped with a mowing motor and a travel drive motor, as the amount of grass increases, the mowing motor is given a higher load to consume more power, and as the rotation speed of the travel drive motor is increased to increase the travel speed of the vehicle, the travel drive motor consumes more power. Because of an accordingly occurring moment-to-moment change in an actual power usage value during traveling, it is difficult to accurately predict a change in the remaining capacity of its battery, and the workable time from the state where the battery is fully charged is unknown.

In the present application, when instantaneous data acquired in real time is dealt with, data, when called with a term "value" such as power value or power set value, means data in the unit of power such as watt (W) or kilowatt (kW) as is the case where data is simply called power. Therefore, it does not mean data in the unit of work, that is, watt-hour (Wh) or kilowatt-hour (kWh), such as electrical energy which is the time-integral of power. However, when instantaneous data is not dealt with, power and electrical energy (work, energy) may be used in substantially the same meaning.

As a self-propelled work machine equipped with a motor for work such as mowing and a travel drive motor as described above, there is known a work machine having a work motor that drives a work part, travel motors that drive wheels, and a control device that controls the driving of the work motor and the travel motors. The control device controls the rotation speed of the work motor to be constant and controls the travel motors such that their rotation speed lowers as the load applied to the work motor increases or as the rotation speed of the work motor lowers (see Patent Document 1).

Also known is an electric working machine in which control is performed by paying attention to the remaining capacity of its battery (see Patent Document 2). In this electric working machine, when the remaining capacity of the battery is low, the travel speed is decreased. Therefore, when the remaining capacity of the battery is low, a power usage value of travel motors decreases, which allows more power to be supplied to a work motor, so that the workable time increases.

Also known is a working machine that shifts the motor rotation speed instructed by a travel operation unit, based on variation in a load applied to its working unit (see Patent Document 3). In this working machine, when the load is high, the speed is lowered, making it possible to reduce the amount of a work target handled per unit time.

PRIOR ART DOCUMENT

Patent Document

Patent Document 1: Japanese Laid-open Patent Publication No. 2018-85907

Patent Document 2: Japanese Laid-open Patent Publication No. 2018-85949

Patent Document 3: Japanese Re-publication of PCT International Publication No. 2019-97683

SUMMARY OF THE INVENTION

Problems to Be Solved by the Invention

However, in the work machines described in the above-mentioned Patent Documents 1 to 3, even though the travel speed is controlled, the actual power usage value during traveling still varies from moment to moment. Accordingly, it is difficult to accurately predict the consumption rate (decrease rate) of the battery and a change in its remaining capacity, and the workable time from the state where the battery is fully charged is unknown. This has the problem that there are many uncertainties in making facility investments according to the scale of mowing, leading to an increase in the investment scale.

It is an object of the present invention to provide a mower that makes it possible to predict a consumption rate of the battery, a change in its remaining capacity, the workable time from the state where the battery is fully charged, and the time when to replace the battery.

Means for Solving the Problems

The present invention achieves the above object by controlling the total power to be constant. Specifically, it has the following configuration.

The present invention is a mower equipped with a mowing motor for rotating mowing blades and a travel drive motor for self-propelling, the mower including:

a crawler belt that is driven by the travel drive motor and constitutes an endless belt;

a battery that supplies power to the mowing motor and the travel drive motor;

a current sensor that measures a current value of the battery; and a control unit that accepts a target rotation speed of the mowing motor and power consumption that are set and input by a user, and while maintaining the set target rotation speed of the mowing motor, finds an actual power usage value that varies according to variation in load to the mowing motor accompanying an increase or a decrease in an amount of grass, by using the current value of the battery measured by the current sensor, and calculates a new target rotation speed of the travel drive motor from a difference between the found actual power usage value and a set value of the power consumption to thereby control a travel speed to make the actual power usage value fall within the set value of the power consumption.

In the above-described mower of the present invention, when the load to the mowing motor varies as the amount of grass increases or decreases, the rotation speed of the travel drive motor is controlled, that is, the travel speed is controlled such that the total power equal to the sum of the power consumed by the mowing motor and the power consumed by the travel drive motor becomes constant. Therefore, the total power during the work is constant, which makes it possible to predict the consumption rate of the battery, a change in its remaining capacity, the workable time from the state where the battery is fully charged, and the time when to replace the battery, and consequently, the aforesaid object is achieved.

The controls in the work machines described in the above-mentioned Patent Documents 1 to 3 are different from the control method of the present invention because they do not keep the total power constant.

Desirably, in the above-described mower,
the control unit calculates the new target rotation speed of the travel drive motor by using a relational formula indicating that the difference between the actual power usage value and the set value of the power consumption is proportional to a difference between new and old values of the target rotation speed of the travel drive motor.

Such a configuration to use the proportional relational formula for the control makes it possible to facilitate the calculation of the new target rotation speed of the travel drive motor.

Desirably, in the above-described mower,
the control unit
accepts an input of a set maximum rotation speed of the travel drive motor in addition to the user-set values of the target rotation speed of the mowing motor and the power consumption, and
sets the maximum rotation speed of the travel drive motor as the new target rotation speed of the travel drive motor when the new target rotation speed of the travel drive motor calculated from the difference between the actual power usage value and the set value of the power consumption exceeds the set maximum rotation speed of the travel drive motor.

Such a configuration to use the maximum rotation speed of the travel drive motor for the control makes it possible to more appropriately control the travel speed. Specifically, when the amount of grass is small, since power consumed by the mowing motor is small, the travel drive motor can consume more power and the target rotation speed of the travel drive motor can also be increased. Even in this case, the set maximum rotation speed of the travel drive motor is set as the upper limit value, which makes it possible to prevent the travel speed from becoming excessively high. Further, in this case, since the power consumed by the travel drive motor is kept low and the total power decreases, this change is in such a direction that the battery lasts longer and thus is not inconvenient for the user.

<Detailed Configuration of Mowing Blades>

Desirably,
the above-described mower includes two left and right mowing blade groups that rotate simultaneously,
the mowing blade groups are each composed of a four or more even number of the mowing blades arranged radially from a rotation center, an even number of the mowing blades include upper mowing blades and lower mowing blades, with height positions of the former and the latter being different, and the mowing blade groups each have the upper mowing blades and the lower mowing blades arranged alternately at equal inter-blade angle intervals,
the mower includes a left/right opposite rotation splitting mechanism that performs rotation transmission in a left/right splitting manner into opposite rotations, to cause the two left and right mowing blade groups to rotate in opposite directions when transmitting the rotation of the single mowing motor to the two left and right mowing blade groups, and reverses rotation directions of the two left and right mowing blade groups from a normal rotation state to a reverse rotation state or from the reverse rotation state to the normal rotation state as a travel direction is switched from forward to backward or from backward to forward, and
the left/right opposite rotation splitting mechanism forms a first overlapping state in which a tip portion of the upper mowing blade composing the right mowing blade group and a tip portion of the lower mowing blade composing the left mowing blade group overlap with each other, forms a second overlapping state in which a tip portion of the lower mowing blade composing the right mowing blade group and a tip portion of the upper mowing blade composing the left mowing blade group overlap with each other, by normally rotating or reversely rotating the two left and right mowing blade groups simultaneously by the inter-blade angle from the first overlapping state, and alternately repeats the two overlapping states.

Such a configuration in which the two left and right mowing blade groups each including an even number of the upper and lower mowing blades arranged at the different height positions are rotated in the opposite directions simultaneously by the single mowing motor enables an efficient mowing work. Further, since the left/right opposite rotation splitting mechanism is capable of reversing the rotation directions of the two left and right mowing blade groups from the normal rotation state to the reverse rotation state or from the reverse rotation state to the normal rotation state as the travel direction is switched from forward to backward or from backward to forward, it is possible to perform an efficient mowing work while switching from/to the forward movement to/from the backward movement by a switchback method without turning around the mower itself on a slope.

Desirably, in the above-described mower,
the mowing blade groups are each composed of four pieces of the mowing blades arranged at the inter-blade angle intervals, the inter-blade angle being 90 degrees, and
out of the four mowing blades, two pieces of the upper mowing blades making 180 degrees are formed of one continuous plate-shaped member, and two pieces of the lower mowing blades making 180 degrees are also formed of one continuous plate-shaped member, and the mowing blade groups are each formed of the two plate-shaped members with the same shape connected in a cross shape with one of the two plate-shaped members being turned inside out.

Such a configuration in which the mowing blade groups each including the four mowing blades are each formed of the two plate-shaped members with the same shape connected in the cross shape with one out of the two plate-shaped members being turned inside out makes it possible to easily manufacture the two left and right mowing blade groups.

<Detailed Configuration of Blocks Composing Crawler Belt>

Desirably, in the above-described mower,
the crawler belt includes:
a flexible belt base wound around a plurality of wheels including a drive wheel and a guide wheel; and a large number of rubber-made spike-shaped blocks mounted on an outer peripheral side of the belt base, and
the blocks each include:
a three-dimensional convex portion all of whose cross sections perpendicular to a mounting surface to the belt base have a convex shape drawn with a smooth line;

a front slope that is formed by cutting the convex portion slantingly from a top of the convex portion or a portion near the top and is a travel-direction front surface in a ground contact state; and left and right skid blocking surfaces formed by cutting the convex portion vertically or substantially vertically from positions apart leftward and rightward from the top.

In such a configuration to provide the crawler belt with a large number of the rubber-made spike-shaped blocks each having the three-dimensional convex portion, the convex portions achieve point contact with the ground to enable quiet and stable traveling, and in addition, the left and right skid blocking surfaces are capable of preventing the mower from skidding when the mowing work is performed on a slope.

Further, desirably, in the above-described mower, the left and right skid blocking surfaces formed by cutting the convex portion vertically or substantially vertically from the positions apart leftward and rightward from the top are first skid blocking surfaces, and in addition to the convex portion, the front slope, and the left and right first skid blocking surfaces, the blocks each include: left and right intermediate shelf surfaces that are formed in parallel or substantially in parallel to the mounting surface to the belt base while intersecting with the first skid blocking surfaces; and left and right second skid blocking surfaces formed vertically or substantially vertically at positions closer to left and right ends than the intermediate shelf surfaces.

Such a configuration in which the blocks each include the intermediate shelf surfaces and the second skid blocking surfaces achieves a more enhanced effect of preventing the mower from skidding when the mowing work is performed on a slope.

Effect of the Invention

As described above, the present invention has the effect of enabling the prediction of the consumption rate of the battery, a change in its remaining capacity, and the workable time from the state where the battery is fully charged since the total power is controlled to be constant during the mowing work. This makes it possible to decide the required charging equipment capacity, the required battery capacity, the number of required spare batteries, and so on per hour (or day), and accordingly makes it possible to construct a system with the minimum configuration for the required scale of the mower. This has the effect of minimizing the operation of mowing equipment in facilities that require large-scale mowing, such as solar power plants, and also minimizing the equipment investment in mowing contracting businesses.

In addition, in constructing an automatic mower, the battery replacement interval can be made constant, which is expected to have the effect of facilitating operation.

MODES FOR CARRYING OUT THE INVENTION

Figure 1:
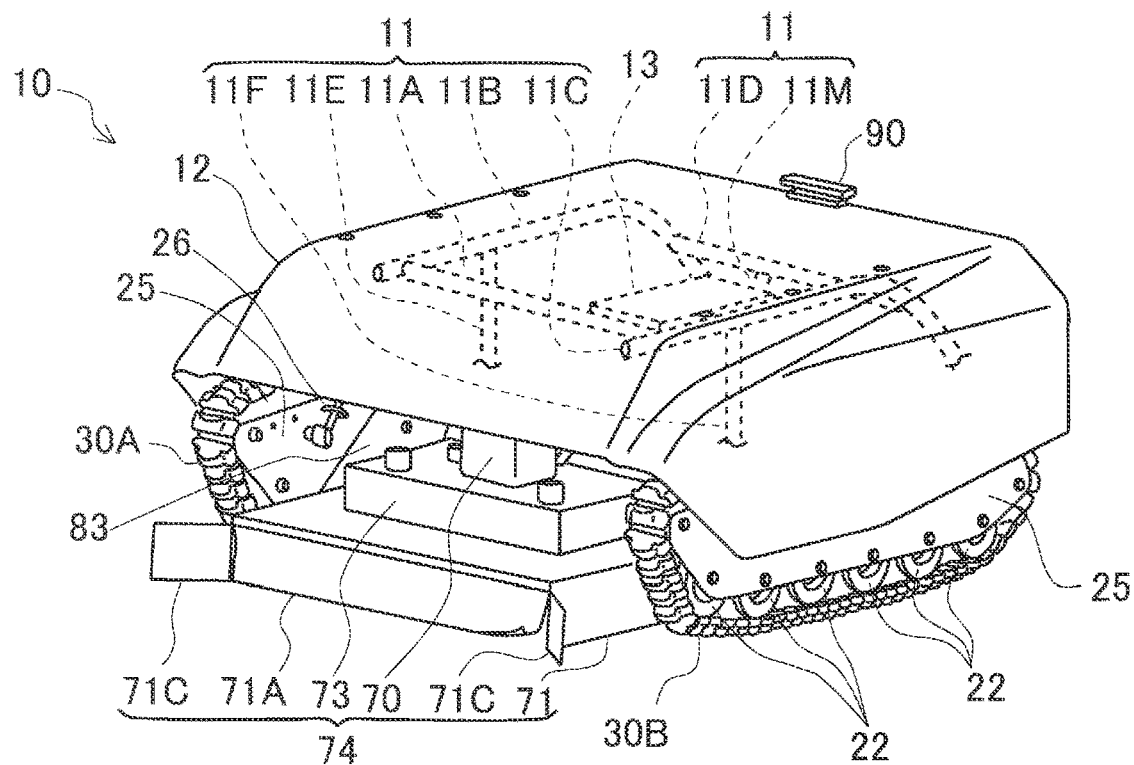
FIG. 1 is an overall perspective view of a mower of one embodiment of the present invention.
Figure 2:
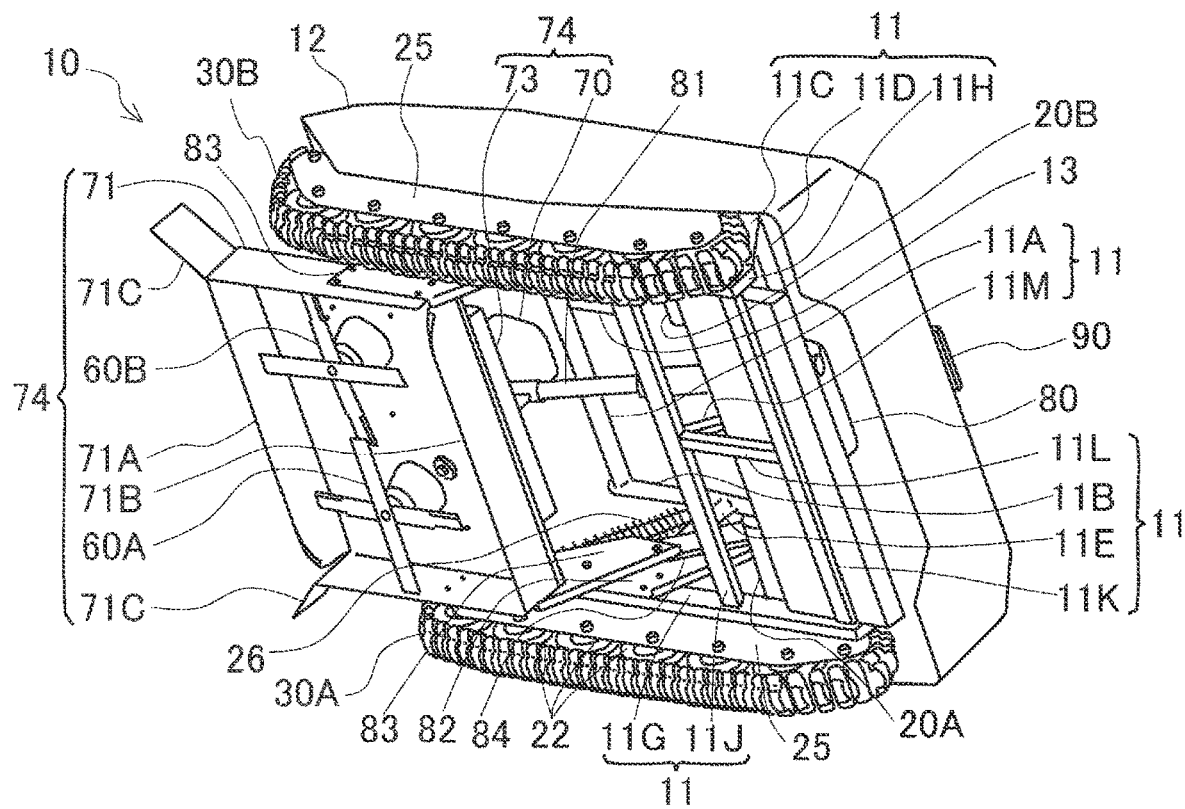
FIG. 2 is an overall perspective view of the mower of the embodiment seen from the bottom side.
Figure 3:
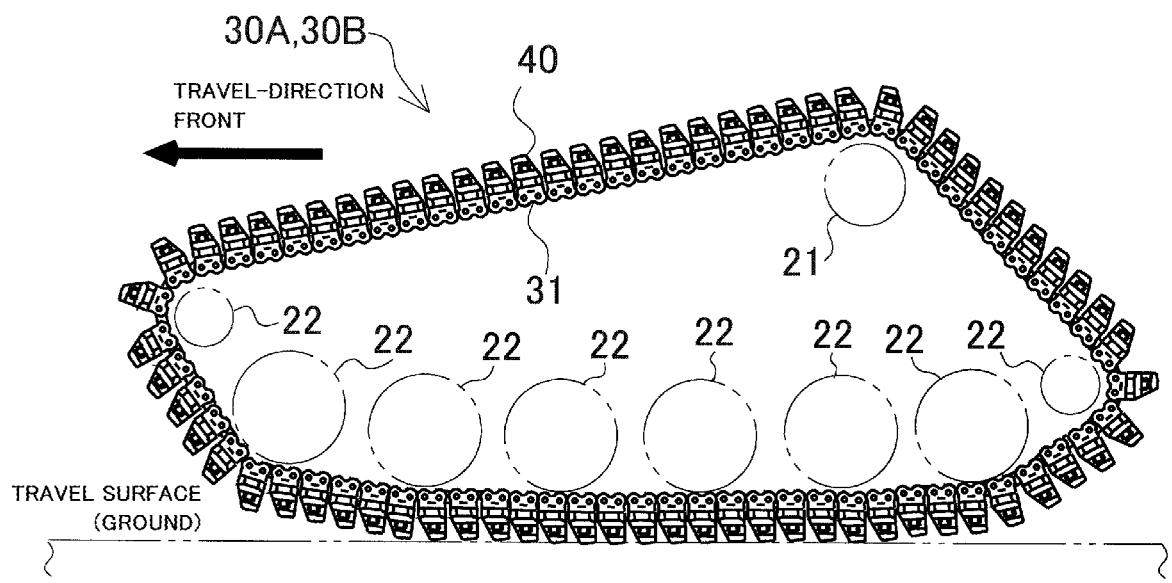
FIG. 3 is a structural view of crawler belts of the embodiment.

An embodiment of the present invention will be hereinafter described with reference to the drawings. FIG. 1 and FIG. 2 illustrate the overall structure of a mower 10 of this embodiment. FIG. 3 illustrates the structure of crawler belts 30A, 30B, and FIG. 4 to FIG. 11 illustrate the structure of a block 40. Further, FIG. 12 to FIG. 15 are explanatory views relating to mowing blades 61A to 64A, 61B to 64B, and FIG. 16 to FIG. 19 are explanatory charts relating to control.
<Overall Structure of Mower 10>

In FIG. 1 and FIG. 2, the mower 10 includes: a frame 11 (11A, 11B, 11C, 11D, 11E, 11F, 11G, 11H, 11J, 11K, 11L, 11M) forming its framework; a cover 12 attached to the frame 11 to cover an upper portion of the mower 10; a box-shaped housing part 13 for various equipment that is attached to the frame 11 inside the cover 12; a right travel drive motor 20A and a left travel drive motor 20B that are for self-propelling; and the right crawler belt 30A and the left crawler belt 30B driven by the travel drive motors 20A, 20B respectively and constituting endless belts.

Note that the right and left here mean right and left when a target object is seen from the mower 10 itself facing a travel-direction front (travel direction at the time of advancing). Further, in the present application, regarding the travel direction of the mower 10, when "travel direction" is simply mentioned, it means only a travel direction when the whole vehicle advances and does not include "a back travel direction" (a travel direction when it backs up (reverses)).

In FIG. 3, the crawler belts 30A, 30B each include: a flexible belt base 31 wound (extended in a circumscribed state) around a plurality of wheels, namely, a drive wheel 21 and a plurality of (eight in this embodiment, for instance) guide wheels 22 which are illustrated with the two-dot chain lines in FIG. 3; and a large number of rubber-made spike-shaped blocks 40 mounted in line on the outer peripheral side of the belt base 31. Note that the crawler belts 30A, 30B and the blocks 40 which are constituent components of the crawler belts 30A, 30B in the present application are not only usable in the mower 10 but also usable in traveling devices (traveling vehicles), for example, an electric wheelchair, a transport vehicle and a search/survey vehicle that are used on bad-conditioned roads, and so on.

The drive wheels 21 are sprockets in this embodiment and are driven to rotate by the travel drive motors 20A, 20B. The belt base 31 is a chain made of metal in this embodiment, and this chain is wound around the sprocket constituting the drive wheel 21 to rotate. A large number of the blocks 40 are mounted on constituent components of the chain.

In FIG. 1 and FIG. 2, the left and right wheels (the drive wheel 21 and the plurality of guide wheels 22) are sandwiched from the inner side and the outer side by plate-shaped wheel mounting members 25 provided vertically, and in this state, are fixed to the wheel mounting members 25. The wheel mounting member 25 to which the right wheels are fixed is attached to the frame 11 (an intersection of the frames 11B, 11E) through a suspension 26, and the wheel mounting member 25 to which the left wheels are fixed is attached to the frame 11 (an intersection of the frames 11C, 11F) through a suspension 26, and consequently, the crawler belts 30B, 30A with a high contact pressure provided on the left and right constitute a travel drive mechanism including the left and right independent suspensions 26.

Figure 16:
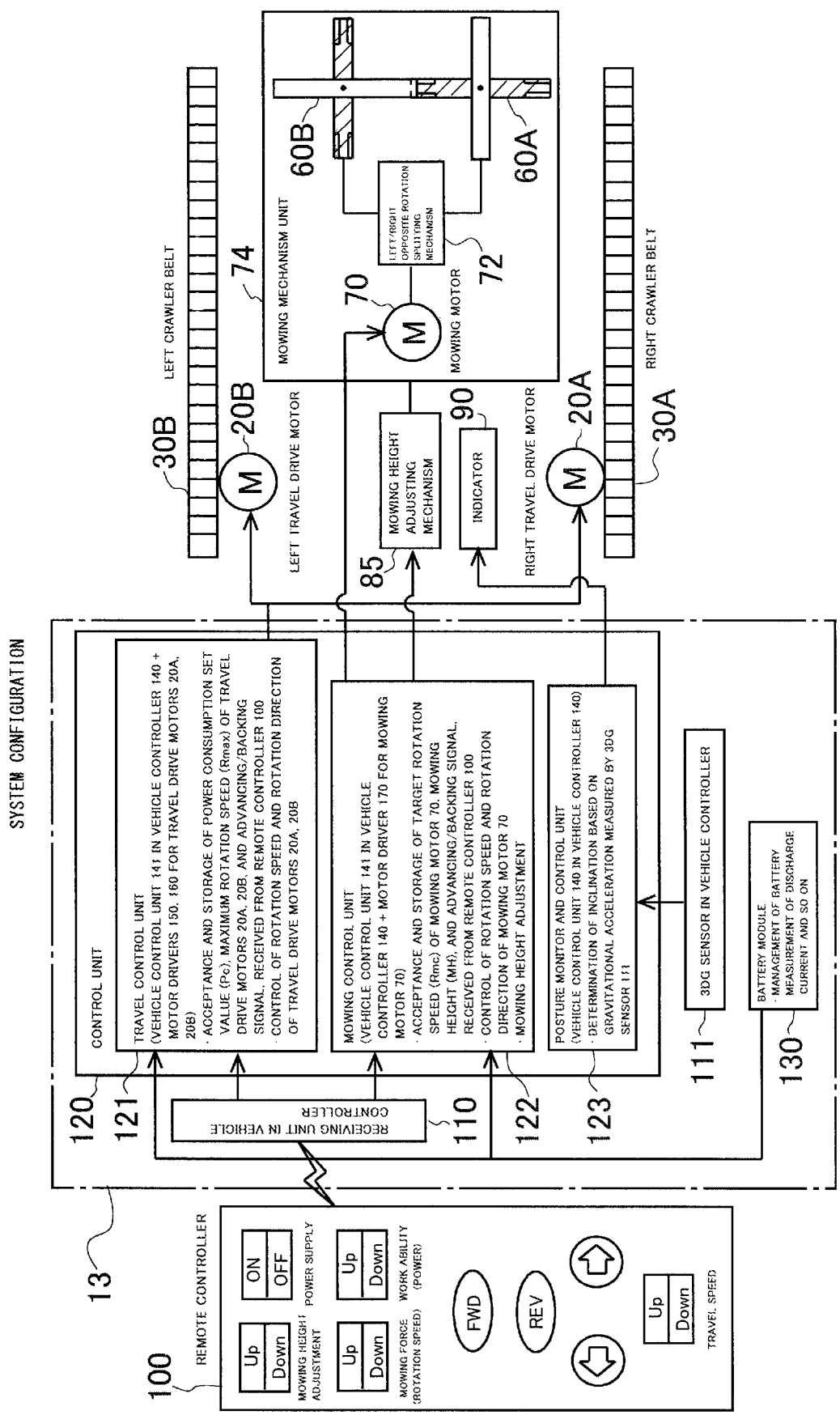
FIG. 16 is a diagram illustrating a system configuration of the embodiment.

The mower 10 further includes: a right mowing blade group 60A and a left mowing blade group 60B; one mowing motor 70 that rotates the two mowing blade groups 60A, 60B simultaneously; a housing part 71 that houses the two mowing blade groups 60A, 60B together; and a left/right opposite rotation splitting mechanism 72 (see FIG. 12, FIG. 13, and FIG. 16) that transmits the rotation (a normal rotation state at the time of advancing or a reverse rotation state at the time of backing) of the single mowing motor 70 simultaneously to the two mowing blade groups 60A, 60B so that the two mowing blade groups 60A, 60B rotate in opposite directions; and a housing part 73 for the left/right opposite rotation splitting mechanism 72, and these constitute a mowing mechanism unit 74 (see FIG. 16).

The lower side (ground side) of the housing part 71 is open so that mowed grass falls down. Further, on front and rear openings of the housing part 71, flexible film-shaped members 71A, 71B made of rubber or the like are provided to prevent stones and gravels on the ground or mowed grass from scattering. Further, at the left and right ends of the front opening of the housing part 71, plate-shaped leading members 71C for taking in grass growing in the front are provided obliquely.

Figure 15:
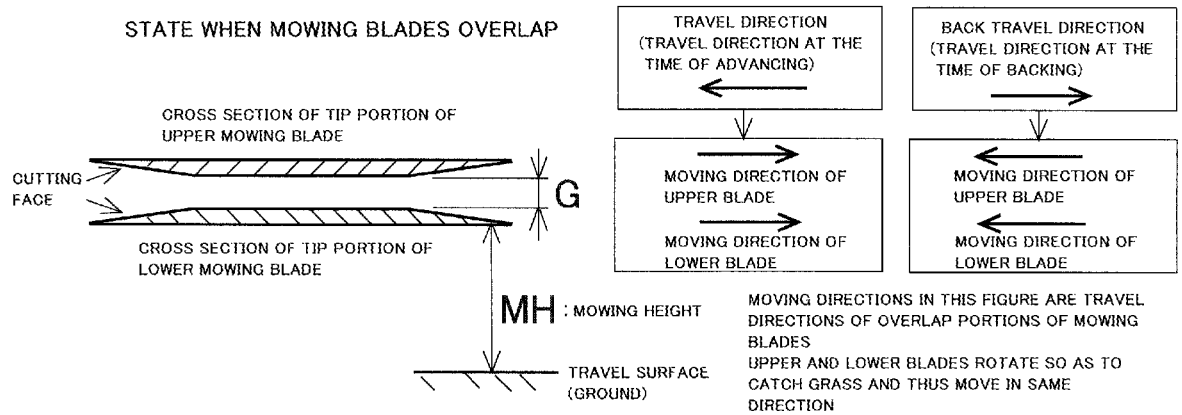
FIG. 15 is an explanatory view illustrating an overlapping state of mowing blades of the embodiment.

The mower 10 further includes: a mowing height adjustment motor 80 for adjusting the height positions of the two left and right mowing blade groups 60A, 60B from the ground; a cylinder 81 that is driven to extend or contract by the rotation of the mowing height adjustment motor 80; left and right plate-shaped guide members 82 fixed to the frame 11; and left and right connection members 83 fixed to the outer sides of the housing part 71. The guide members 82 are each provided with an oblique, slim linear guide hole 84 (which may be a guide groove), and owing to these guide holes 84, the connection members 83 are slidably engaged with the respective guide members 82 in a two-point support state. Therefore, when the mowing height adjustment motor 80 rotates to extend or contract the cylinder 81, the left and right connection members 83 slide up or down by being guided by the guide holes 84 of the left and right guide members 82 while maintaining their postures, and the entire mowing mechanism unit 74 (including the two mowing blade groups 60A, 60B, the mowing motor 70, the housing part 71, the left/right opposite rotation splitting mechanism 72, and the housing part 73) moves up or down while keeping its posture horizontal, and these constitute a mowing height adjusting mechanism 85 (see FIG. 16) that adjusts a mowing height MH (height dimension from the ground to the lower surfaces of the lower mowing blades as illustrated in FIG. 15).

Note that a range of the mowing height MH is, for example, 20 to 100 mm. Here, since the guide holes 84 of the guide members 82 are oblique, when the mowing blade groups 60A, 60B move down, not only the mowing height MH decreases but also the mowing blade groups 60A, 60B project forward. On the other hand, when the mowing blade groups 60A, 60B move up, not only the mowing height MH increases but also the mowing blade groups 60A, 60B retract rearward. Therefore, in the case where grass is growing in a place that is narrow and has no height allowance, it is possible to perform the mowing work while inserting the housing part 71 (including the two mowing blade groups 60A, 60B) into the narrow space.

The mower 10 further includes, at a rear position on the outside of the cover 12, an indicator 90 indicating whether or not the posture of the vehicle has a margin or indicating a degree of the margin. Note that the installation position of the indicator 90 is not limited to this position and may be any position where the indicator 90 is easily seen from a user performing a remote operation.

A 3DG sensor 111 (3-axis acceleration sensor) installed in a later-described vehicle controller 140 (see FIG. 17) measures gravitational acceleration, and since a value of a component in the up-down direction of the vehicle (this is not the plum direction in the case where the vehicle is inclined) and a value of a component in the left-right direction of the vehicle (this is not the horizontal direction in the case where the vehicle is inclined) of a gravitational acceleration vector change as the vehicle traveling on a slope inclines, the posture (magnitude of the inclination) of the vehicle is calculated by capturing the change, and from the comparison with a preset threshold value, whether or not the posture has a margin or a degree of the margin is determined, and the determination result is output to the indicator 90.

<Detailed Structure of Blocks 40 Composing Crawler Belts 30A, 30B>

Figure 4:
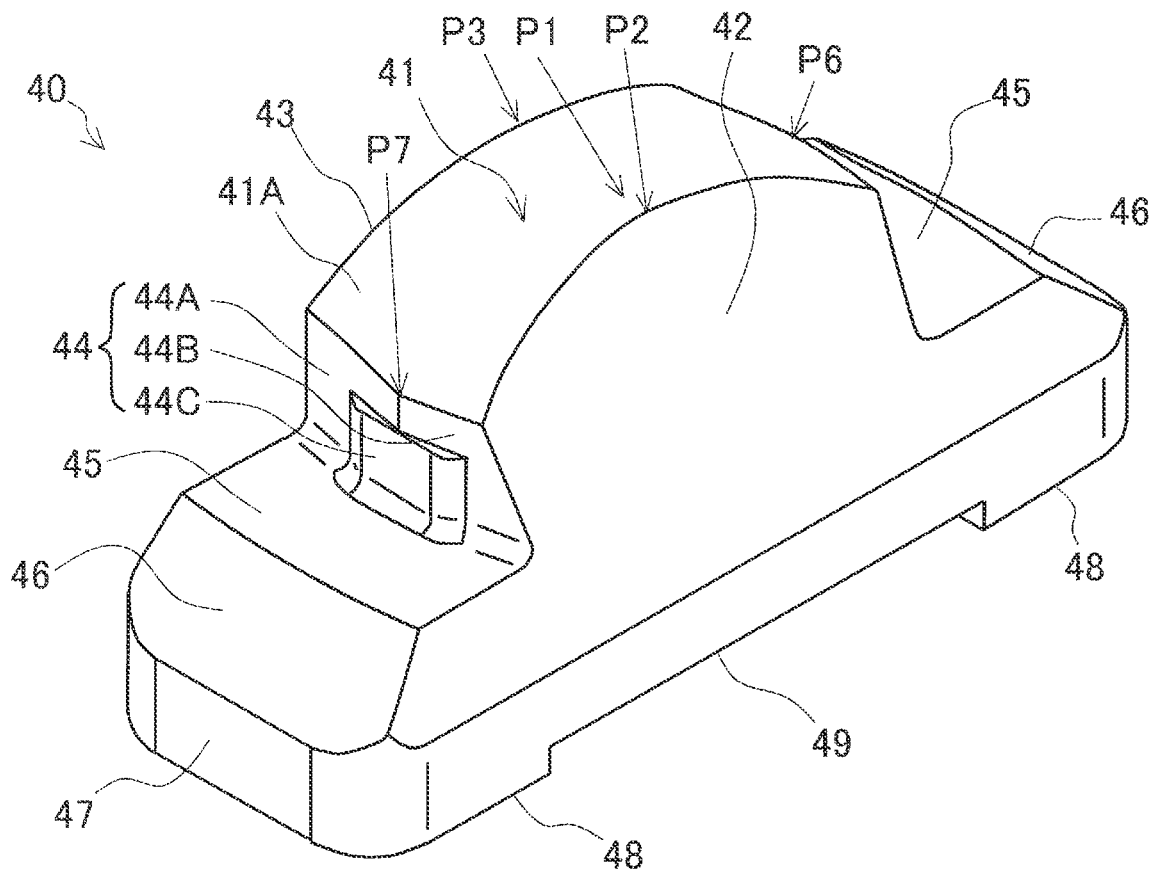
FIG. 4 is a perspective view of a block of the embodiment.
Figure 5:
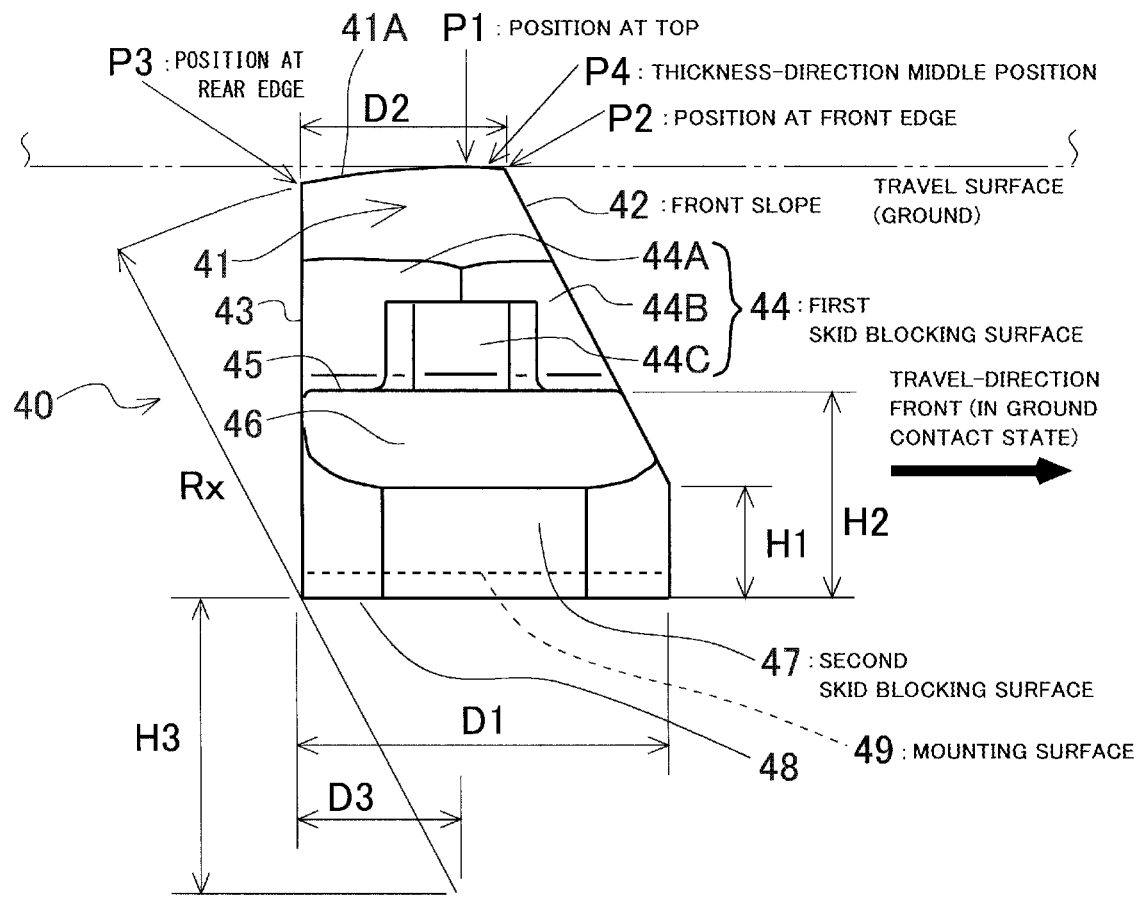
FIG. 5 is a side view of the block of the embodiment.
Figure 6:
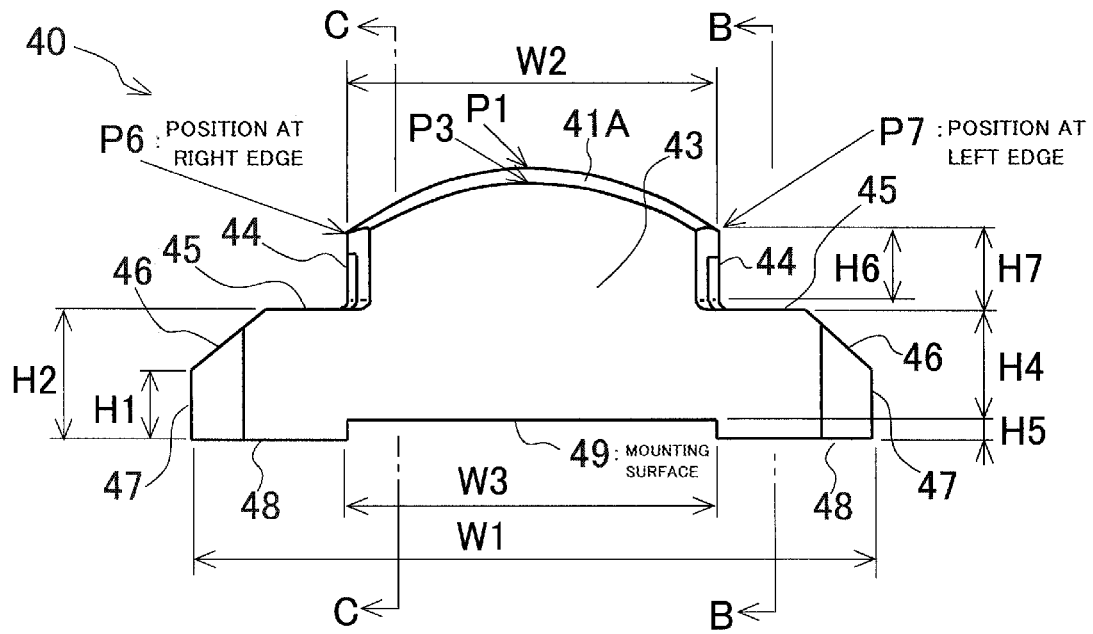
FIG. 6 is a view of the block of the embodiment seen from a travel-direction rear side in a ground contact state.
Figure 9:
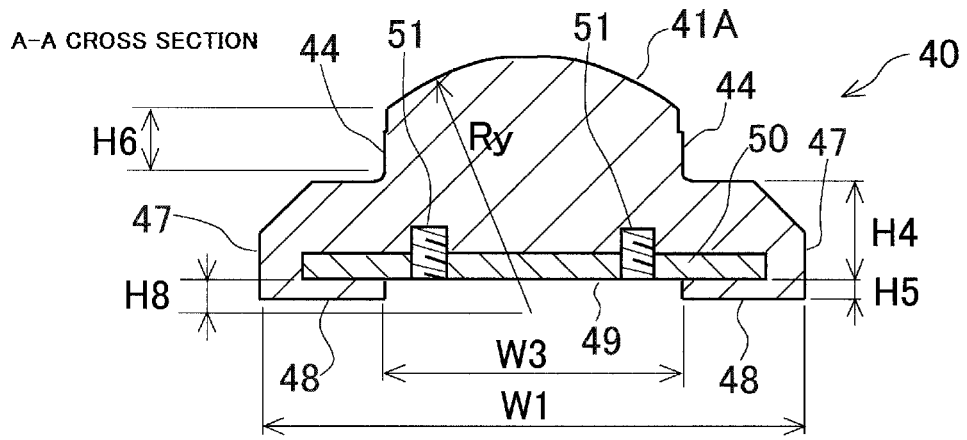
FIG. 9 is a sectional view taken along the A-A line in FIG. 8.

In FIG. 4 to FIG. 6, the block 40 has a laterally symmetrical shape in this embodiment and includes a three-dimensional convex portion 41 all of whose cross sections perpendicular to its mounting surface 49 to the belt base 31 have a convex shape drawn with a smooth line. That is, the convex portion 41 has a three-dimensional mountain shape. The smooth line drawing the convex shape is a circle as an example in this embodiment, but is not limited to this and may be, for example, an ellipse, a two-dimensional curve, or the like, or may be a line in which a circle, an ellipse, a two-dimensional curve, and the like are connected. Therefore, the contour shape of the convex portion 41 seen from the right or the left as in FIG. 5, FIG. 10, and FIG. 11 and the contour shape of the convex portion 41 seen in a direction along the belt base 31 (seen in the travel-direction front or rear when the blocks 40 are in contact with the ground) as in FIG. 6 and FIG. 9 are both a convex shape drawn with a smooth line (circle as an example in this embodiment).

Further, as illustrated in FIG. 5, the block 40 has a front slope 42 formed by obliquely cutting the convex portion 41 from position P1 at the top of the convex portion 41 or a portion near the position P1 (position P2 or the like). This front slope 42 is planar and is a travel-direction front surface in the state where the block 40 is in contact with the ground. In this embodiment, as illustrated in FIG. 5, the front slope 42 is formed by cutting not from the position P1 at the top but from the position P2 more forward than P2 in terms of the travel direction, and this P2 is the middle position (left-right middle position) of a front edge (curve), of the convex portion 41, which is formed by a curved surface 41A of the convex portion 41 and the planar front slope 42 intersecting with each other.

Therefore, the ground contact point of the block 40 is the position P1 at the top if the contact ground is a very hard road surface, the vehicle is at halt, and the block 40 itself does not elastically deform at all. Actually, however, a surface on which the mower 10 travels (a surface with which the block 40 comes into contact) is usually a ground where grass is growing and thus is softer than a paved road surface or the like, the belt base 31 is flexible, and the block 40 itself is also an elastic member made of rubber. Therefore, the position P2 (the middle position of the front edge of the convex portion 41) is actually the ground contact point of the block 40. Note that the front slope 42 may be formed by cutting the convex portion 41 from the position P1 at the top, or the front slope 42 may be formed by cutting from a position more rearward than P1 in terms of the travel direction, and in any case, the middle position of the front edge, of the convex portion 41, which is formed by the front slope 42 and the surface 41A of the convex portion 41 intersecting with each other is the ground contact point of the block 40.

The block 40 further has, on the opposite side of its front slope 42, a rear surface 43 formed vertically or substantially vertically to the mounting surface 49 to the belt base 31. The rear surface 43 is planar and is a travel-direction rear surface in the state where the block 40 is in contact with the ground. The position P3 in FIG. 4 to FIG. 6 is the middle position (left-right middle position) of a rear edge (curve), of the convex portion 41, formed by the curved surface 41A of the convex portion 41 and the planar rear surface 43 intersecting with each other.

As illustrated in FIG. 6, the block 40 further has right and left first skid blocking surfaces 44 formed by cutting the convex portion 41 vertically or substantially vertically from the positions P6 and P7 apart leftward and rightward from the position P1 at the top. Strictly speaking, these first skid blocking surfaces 44 are not planar but each include two surfaces 44A, 44B making an obtuse angle and a bridge surface 44C extending over a range including the surfaces 44A, 44B to cover an intersection of the surfaces 44A, 44B as illustrated in FIG. 5. However, from the viewpoint of the function to prevent the skidding of the whole vehicle, the first skid blocking surfaces 44 may be considered as being substantially planar. The portion where the curved surface 41A of the convex portion 41 and the right first skid blocking surface 44 intersect (P6 in FIG. 4 and FIG. 6) is a right edge of the convex portion 41, and a portion where the curved surface 41A of the convex portion 41 and the left first skid blocking surface 44 intersect (P7 in FIG. 4 and FIG. 6) is a left edge of the convex portion 41. Note that P6 (right edge) is drawn on the left and P7 (left edge) is drawn on the right on the sheet of FIG. 6 because the left and the right are left and right when they are viewed from the vehicle itself The block 40 further has: left and right intermediate shelf surfaces 45 (planar surfaces) formed in parallel or substantially in parallel to the mounting surface 49 to the belt base 31 while intersecting with the first skid blocking surfaces 44; left and right end slopes 46 (planar surfaces) formed obliquely at positions closer to the left and right ends than the intermediate shelf surfaces 45; and left and right second skid blocking surfaces 47 (planar surfaces) formed vertically or substantially vertically at positions still closer to the left and right ends than the end slopes 46.

Figure 7:
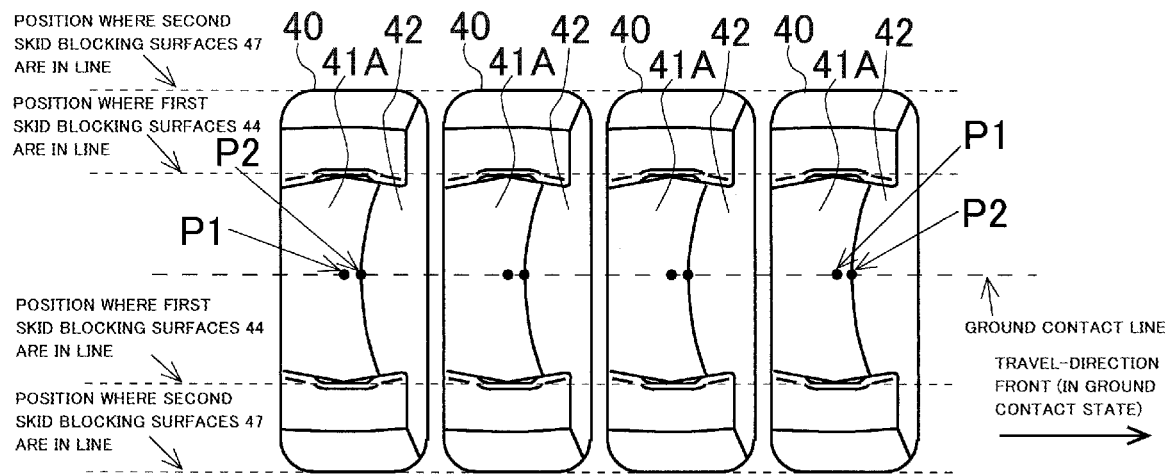
FIG. 7 is a view illustrating a ground contact line of the crawler belt of the embodiment.

In FIG. 7, the line connecting the ground contact points (positions P2) of a large number of the blocks 40 mounted in line on the belt base 31 is a ground contact line of the crawler belt 30A, 30B. Further, the first skid blocking surfaces 44 of a large number of the blocks 40 are arranged coplanarly, and the second skid blocking surfaces 44 of a large number of the blocks 40 are similarly arranged coplanarly.

As illustrated in FIG. 8 to FIG. 11, in manufacturing the block 40, which is made of rubber, a core material 50 made of a steel plate such as a cold-rolled steel plate (SPCC plate) is inserted, followed by rubber vulcanization molding, for instance. As the material of the rubber, NR (natural rubber), CR (chloroprene rubber), or the like is usable, for instance. The hardness of the rubber is preferably about 60 similarly to that of a studless tire, in consideration of travel performance on snowy roads and muddy roads. Specifically, since the hardness of automobile tires is about 60 to 70, the hardness of the rubber is preferably about 60 which is a softer value in this range.

The core material 50 has a rear surface 43-side end portion bent toward the surface 41A of the convex portion 41. The core material 50 is provided with a plurality of (two in this embodiment) bolt screw holes 51 (having a screw diameter of, for example, 4 mm) used for mounting the block 40 on the belt base 31. The screw holes 51 penetrate through the core material 50 to extend up to the rubber portion and have a depth of 6 mm, for instance.

The radius of curvature of the surface 41A of the convex portion 41 in FIG. 5 is Rx=45 mm, for instance. In this embodiment, the center position of the radius of curvature Rx is not the thickness-direction middle position (the position of the dimension D4 from the rear surface 43) but is a position of the dimension D3 (D3<D4) from the rear surface 43. Therefore, since the position P1 at the top of the convex portion 41 in FIG. 5 is a position of the dimension D3 (D3<D4) from the rear surface 43, the position P1 at the top is a position more rearward in terms of the travel direction (position closer to the rear surface 43) than the position P4 (thickness-direction middle position) in this embodiment. For example, if the thickness dimension D1=23 mm, D2=13 mm, D3=9.7 mm, and D4 (see FIG. 8, FIG. 10, and FIG. 11)=D1×0.5=11.5 mm, the position P1 at the top of the convex portion 41 in FIG. 5 is a position 9.7 mm apart from the rear surface 43, the position P2 at the front edge of the convex portion 41 is a position 13 mm apart from the rear surface 43, and the thickness-direction middle position P4 is a position 11.5 mm apart from the rear surface 43. Note that the position P1 at the top of the convex portion 41 may coincide with the thickness-direction middle position P4 (P1=P4), the position P2 at the front edge of the convex portion 41 may coincide with the position P1 at the top (P1=P2) or with the thickness-direction middle position P4

(P2=P4), or these three positions P1, P2, P4 may coincide with one another (P1=P2=P4).

Further, in FIG. 5, the height dimension H1 from a bottom surface 48 which is the closest to the belt base 31 is the height dimension of the second skid blocking surfaces 47 and is H1=7.2 mm, for instance. The height dimension H2 from the bottom surface 48 up to the intermediate shelf surfaces 45 is H2=13 mm, for instance. The height dimension H3 from the bottom surface 48 up to the center position of the radius of curvature Rx is H3=18.6 mm, for instance.

In FIG. 6, the height dimension H4 from the mounting surface 49 to the belt base 31 up to the intermediate shelf surfaces 45 is H4=11 mm, for instance, and the height dimension H5 from the bottom surface 48 up to the mounting surface 49 is H5=2 mm, for instance. The height dimension H6 of the first skid blocking surfaces 44 is H6=7.13 mm, for instance, and in this embodiment, is substantially equal to the height dimension H1 (for example, 7.2 mm) of the second skid blocking surfaces 47. However, the height dimensions H6 and H1 of the first and second skid blocking surfaces 44, 47 do not necessarily have to be equal or substantially equal to each other. Further, the total height including R1 (1 mm radius) of corners where the first skid blocking surfaces 44 and the intermediate shelf surfaces 45 intersect is H7=8.13 mm, for instance.

Here, the first and second skid blocking surfaces 44, 47 are walls standing vertically or substantially vertically, and from a viewpoint of preventing the whole vehicle from skidding, it suffices if these walls firmly catch grass and soil. Without the walls, grass and soil are not caught, resulting in skidding. Therefore, to surely catch stems of grass trodden by the crawler belts 30A, 30B, the walls may have a height equal to or more than the diameter of the grass stems. However, the walls, if having at least the height equal to or more than the radius of the grass stems, have a higher possibility of catching the grass without allowing the grass to escape and thus are capable of exhibiting the skid preventing function that is effective to a certain degree. In the case of assuming the mowing of grass whose stem diameter is up to about 10 mm, the stem radius of the grass is up to about 5 mm, and thus the wall heights, that is, the height dimensions H6, H1 of the first and second skid blocking surfaces 44, 47 are preferably equal to or more than 6 mm.

The shape of the block 40 is characterized in that the first and second skid blocking surfaces 44, 47 are formed in a staircase shape. Specifically, when the block 40 is placed while oriented upward with the top of the convex portion 41 being considered as a mountaintop, its characteristic lies in that it is in the shape as if one climbs its steps from the left and right sides. If grooves are engraved like tread patterns of an automobile tire (if grooves extending inward from the surface 41A of the convex portion 41 are provided), grass and soil are not easily caught and thus the skid preventing effect cannot be expected. This is because even by engraving grooves with a 6 mm depth or more, it is not possible to obtain the skid preventing effect unless grass stems enter the grooves, and even if the grass stems enter the grooves by chance, the grass stems are difficult to get out to clog the grooves, leading to a lower skid preventing function. On the other hand, since the block 40 of the present application has the staircase shape, space on the right side of the right first skid blocking surface 44 is open and space on the left side of the left first skid blocking surface 44 is also open, unlike the case where grooves are formed. Similarly, space on the right side of the right second skid blocking surface 47 is open and space on the left side of the left second skid blocking surface 47 is also open. "Open" means that no structure of the mower 10 itself is present and there is no obstacle. This facilitates catching grass and soil. Further, even if only the first skid blocking surfaces 44 are installed without the second skid blocking surfaces 47 being installed, the skid preventing effect is exhibited as long as the space on the right side of the right first skid blocking surface 44 is open and the space on the left side of of the left first skid blocking surface 44 is also open.

Further, in FIG. 6, the left-right direction width dimension W1 of the block 40 is W1=66 mm, for instance. The width dimension W2 from the position P6 at the right edge of the convex portion 41 up to the position P7 at its left edge is a distance between the left and right first skid blocking surfaces 44 and is W2=36 mm, for instance. The width dimension W3 of the mounting surface 49 is W3=36 mm, for instance.

Figure 8:
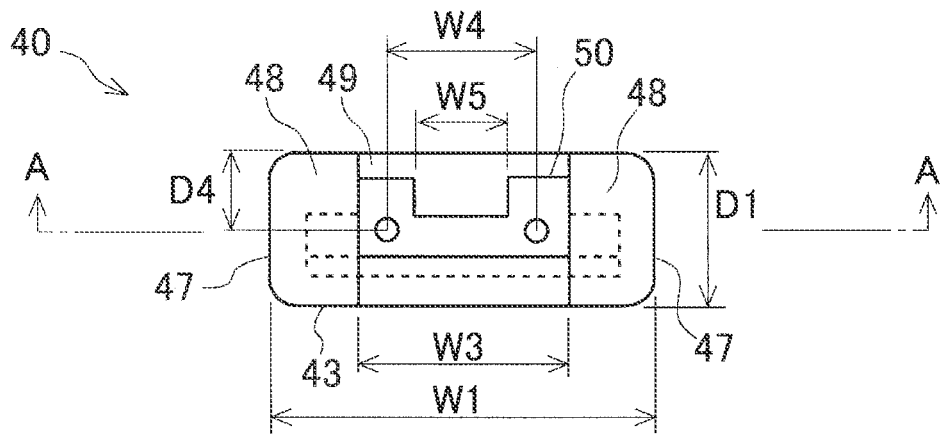
FIG. 8 is a view of the block of the embodiment seen from a belt base side.

In FIG. 8, the plurality of (two in this embodiment) screw holes 51 are provided at the thickness-direction middle positions. Therefore, D4=D1×0.5, and for example, D4=11.5 mm. For example, the distance W4 between the two screw holes 51 is W4=25.4, and W5=16 mm.

The radius of curvature of the surface 41A of the convex portion 41 in FIG. 9 is Ry=29 mm, for instance. The center position of this radius of curvature Ry is a position of the height dimension H8 from the mounting surface 49, and for example, H8=4 mm. FIG. 9 illustrates a cross section taken along the A-A line in FIG. 8 and thus illustrates a cross section at the thickness-direction middle position (the position P4 in FIG. 5).

Figure 10:
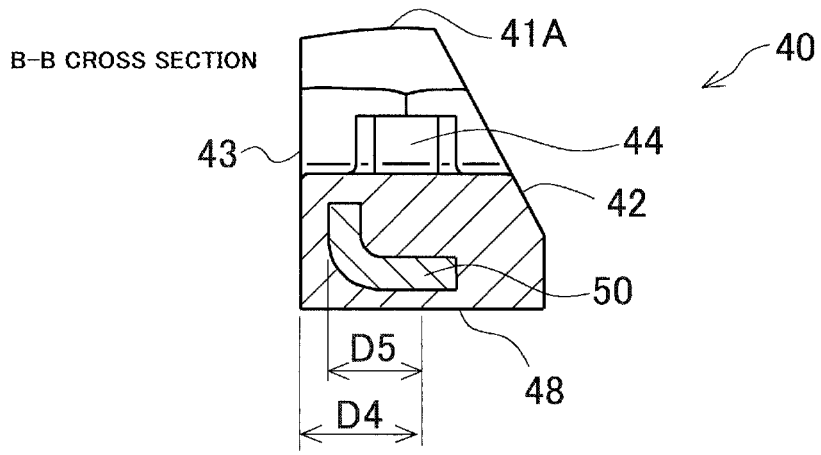
FIG. 10 is a sectional view taken along the B-B line in FIG. 6.
Figure 11:
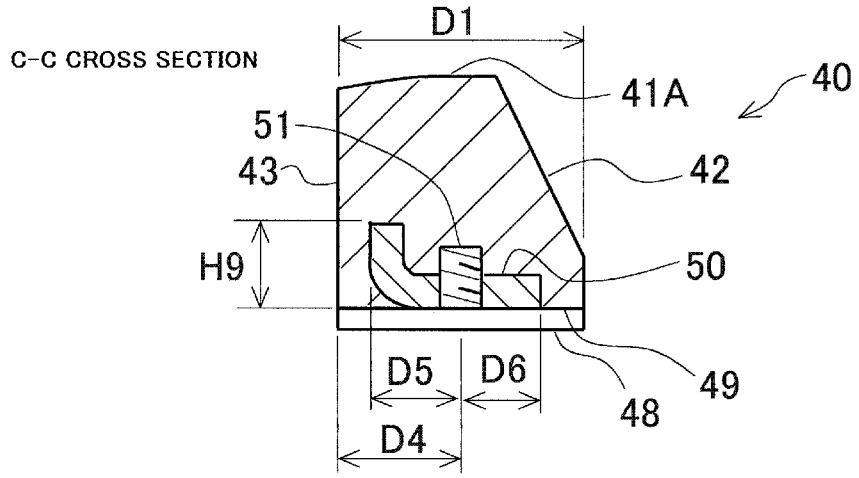
FIG. 11 is a sectional view taken along the C-C line in FIG. 6.

In FIG. 10 and FIG. 11, the core material 50 is inserted up to the position of the dimension D5 toward the rear surface 43 and up to the position of the dimension D6 toward the front slope 42, from the thickness-direction middle position where the screw holes 51 are provided (the position of the dimension D4 from the rear surface 43). For example, D4=11.5 mm, D5=8.7 mm, and D6=7.5 mm. The height dimension H9 of the bent portion of the core material 50 is H9=8.2 mm, for instance.

<Detailed Structure of Mowing Blades>

Figure 12:
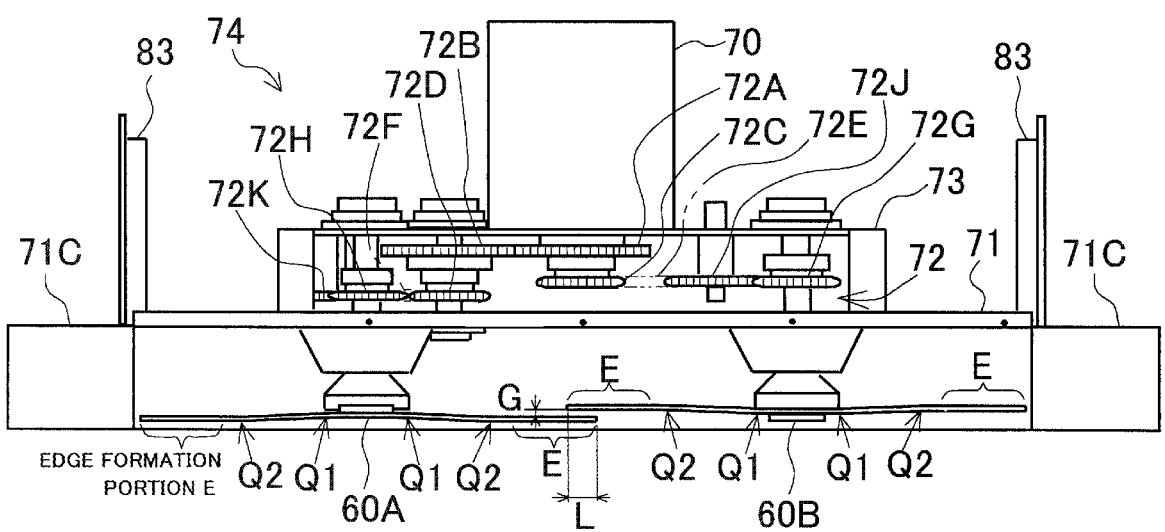
FIG. 12 is a structural view of mowing blade groups and a left/right opposite rotation splitting mechanism of the embodiment.
Figure 13:
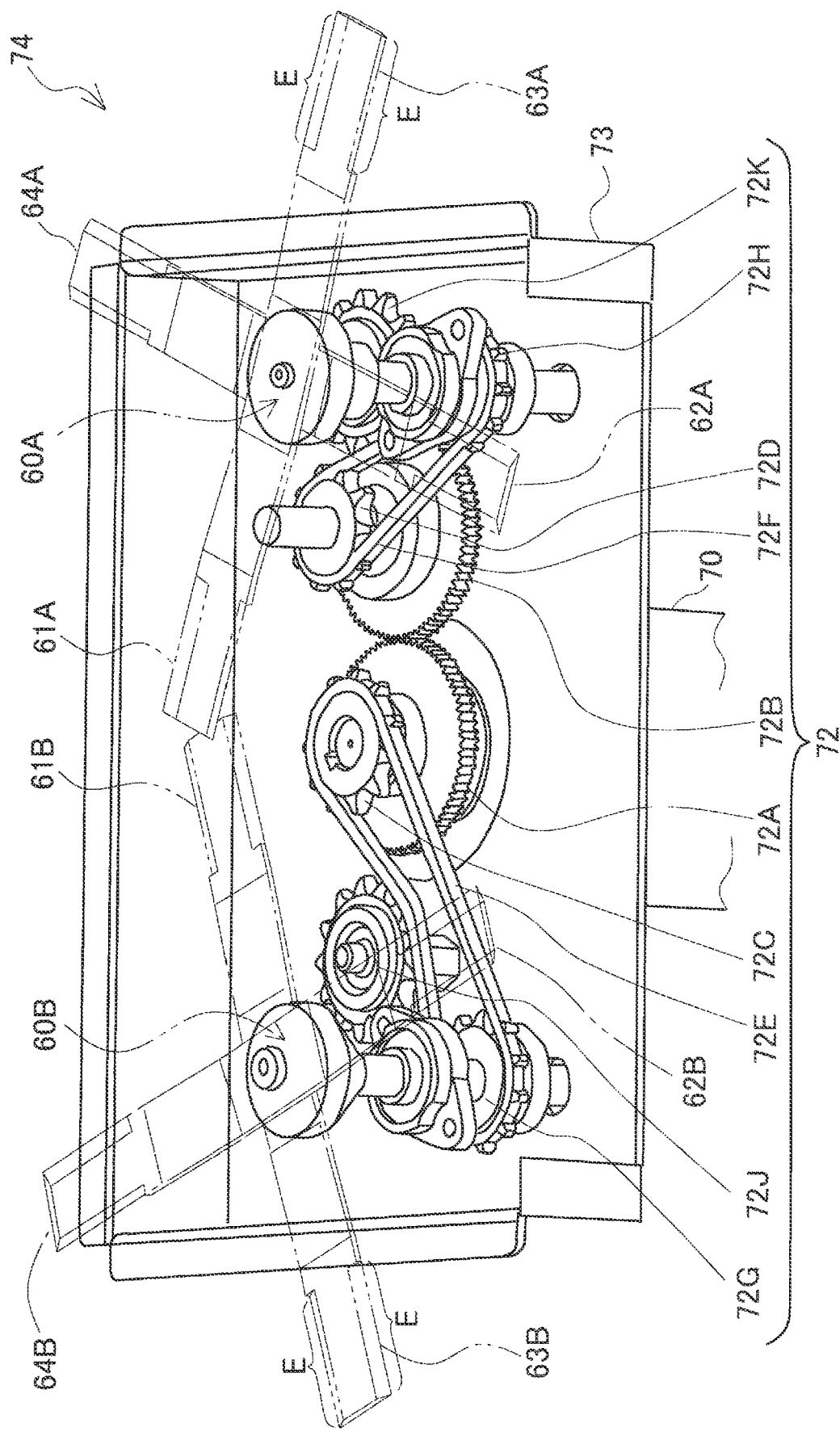
FIG. 13 is a perspective view of the mowing blade groups and the left/right opposite rotation splitting mechanism of the embodiment.

In FIG. 12 and FIG. 13, the left/right opposite rotation splitting mechanism 72 of the mowing mechanism unit 74 includes: a gear 72A coaxial with the mowing motor 70 and rotatably driven by the mowing motor 70; a gear 72B engaged with the gear 72A to rotate in the direction opposite the rotation direction of the mowing motor 70; a sprocket 72C that rotates coaxially with the gear 72A; a sprocket 72D that rotates coaxially with the gear 72B; a chain 72E that transmits the rotation of the sprocket 72C; a chain 72F that transmits the rotation of the sprocket 72D; a sprocket 72G that receives the rotation transmitted from the chain 72E to rotate the left mowing blade group 60B coaxially; a sprocket 72H that receives the rotation transmitted from the chain 72F to rotate the right mowing blade group 60A coaxially; an idler 72J that adjusts the flexure of the chain 72E; and an idler 72K that adjusts the flexure of the chain 72F. Left and right components making a pair have the same number of teeth and the same diameter (however, the chains 72E, 72F have different lengths), which achieves the accurate rotation transmission in the left/right splitting manner into opposite rotations.

As illustrated in FIG. 13, the right mowing blade group 60A includes a four or more even number of (four in this embodiment) mowing blades 61A, 62A, 63A, 64A arranged radially from the rotation center, and the left mowing blade group 60B similarly includes the same number of (four in this embodiment) mowing blades 61B, 62B, 63B, 64B arranged radially from the rotation center. Note that the blades on the right side are denoted by reference signs with A and the blades on the left side are denoted by reference signs with B. Since the right side and the left side here are a right side and a left side when they are seen from the vehicle itself, A is written on the left side and B is written on the right side on the sheet of FIG. 12.

Out of a four or more even number of (four in this embodiment) the mowing blades 61A, 62A, 63A, 64A composing the right mowing blade group 60A, the mowing blades 62A, 64A corresponding to half the number are upper mowing blades arranged at an upper height position (upper side when they are seen from the vehicle itself), and the mowing blades 61A, 63A corresponding to the other half are lower mowing blades arrange at a lower height position. Similarly, out of a four or more even number of (four in this embodiment) the mowing blades 61B, 62B, 63B, 64B composing the left mowing blade group 60B, the mowing blades 61B, 63B corresponding to half the number are upper mowing blades and the mowing blades 62B, 64B corresponding to the other half are lower mowing blades.

In this manner, in both the right and left mowing blade groups 60A, 60B, the upper mowing blades and the lower mowing blades are alternately arranged. The angles made by the mowing blades (inter-blade angles) are equal. Therefore, in this embodiment, the inter-blade angle is 90 degrees since the number of the blades is four.

In the right mowing blade group 60A, out of the four mowing blades 61A to 64A, the two upper mowing blades 62A, 64A making 180 degrees are formed of a single continuous plate-shaped member, and the two lower mowing blades 61A, 63A making 180 degrees are also formed of a single continuous plate-shaped member. Similarly, in the left mowing blade group 60B, out of the four mowing blades 61B to 64B, the two upper mowing blades 61B, 63B making 180 degrees are formed of a single continuous plate-shaped member, and the two lower mowing blades 62B, 64B making 180 degrees are also formed of a single continuous plate-shaped member.

The right and left mowing blade groups 60A, 60B are each formed of the two plate-shaped members with the same shape connected in a cross shape with one of the two plate-shaped members being turned inside out. Therefore, for example, the plate-shaped member forming the two upper mowing blades 62A, 64A and the plate-shaped member forming the two lower mowing blades 61A, 63A have the same shape. This facilitates their manufacturing.

As illustrated in FIG. 12, in this embodiment, the plate-shaped member forming the two mowing blades is bent at two places (Q1 point and Q2 point in FIG. 12) when it is seen from the rotation center. The plate-shaped member forming the upper mowing blades is bent upward at the Q1 point close to the rotation center and is returned to a horizontal state at the Q2 point on the outer side of the Q1 point. On the other hand, the plate-shaped member forming the lower mowing blades, which is in the inside-out state as described above, is bent downward at the Q1 point close to the rotation center and is returned to the horizontal state at the Q2 point on the outer side of the Q1 point. Consequently, a gap dimension G (see FIG. 12 and FIG. 15) between the lower mowing blade of the right mowing blade group 60A and the upper mowing blade of the left mowing blade group 60B when they overlap with each other or between the upper mowing blade of the right mowing blade group 60B and the lower mowing blade of the left mowing blade group 60B when they overlap with each other is set to an appropriate dimension. Note that the gap dimension G is G=5 mm, for instance, and the dimension L (see FIG. 12) of the overlap portion is L=16 mm, for instance. Owing to this overlapping, grass is sandwiched by the upper and lower mowing blades to be crushed.

Further, edge formation portions E are provided in the horizontal portions on the outer side of the Q2 points. Since the rotation of the mowing blades includes normal rotation at the time of the advancing of the vehicle and reverse rotation at the time of the backing when the vehicle backs up (reverses), the edge formation portions E are provided both in the rotation front portion and the rotation rear end portion, and by reversing the normal or reverse rotation, either of the edges can be a rotation front edge. Therefore, in this embodiment, in each of the plate-shaped members each forming the two mowing blades, the edge formation portion E is provided at four places (see FIG. 13). Further, as illustrated in FIG. 15, in the upper mowing blades, cutting faces in the edge formation portions E are on a lower surface side, and in the lower mowing blades, they are on an upper surface side. Note that the edges each may have the cutting faces on both the upper surface side and the lower surface side, by adjusting the gap dimension G.

Figure 14:
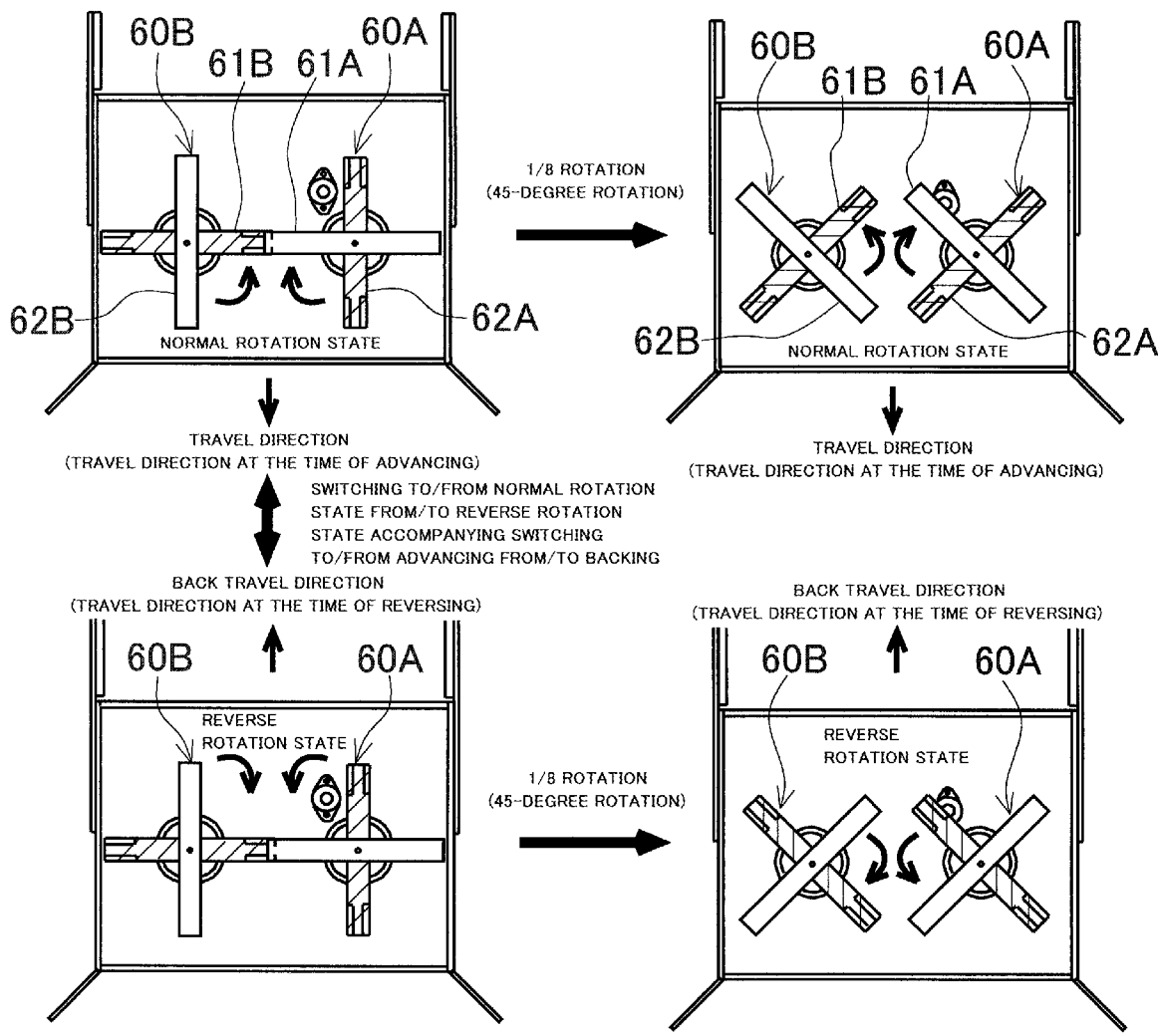
FIG. 14 is an explanatory view of the rotation directions of the mowing blade groups of the embodiment.

In FIG. 14, the right and left mowing blade groups 60A, 60B are always rotated at the same rotation speed (absolute value) in opposite directions by the left/right opposite rotation splitting mechanism 72 (see FIG. 12 and FIG. 13). That is, both in the normal rotation state at the time of the advancing of the mower 10 and in the reverse rotation state at the time of the backing when the mower 10 backs up (reverses), they always rotate in the opposite directions and the absolute values of their rotation speeds are equal. Note that the hatching on the mowing blades in FIG. 14 does not indicate a cross section but is drawn for easy distinction between the upper and lower mowing blades.

On the upper left in FIG. 14, the normal rotation state at the time of the advancing of the mower 10 is illustrated. The lower mowing blade 61A composing the right mowing blade group 60A and the upper mowing blade 61B composing the left mowing blade group 60B are in the overlapping state. Note that in FIG. 14, which illustrates views seen from the lower side (ground side), the upper side and the lower side are reversed. The right and left mowing blade groups 60A, 60B, which rotate in the opposite directions, rotate so as to drag in grass growing in the travel-direction front.

The ⅛ rotation (45-degree rotation) of both the right and left mowing blade groups 60A, 60B while the rotation direction in the normal rotation state on the upper left in FIG. 14 is kept results in the state on the upper right in FIG. 14. Further, switching from advancing to backing to reverse the rotation directions of both the right and left mowing blade groups 60A, 60B results in the reverse rotation state on the lower left in FIG. 14 at the time of backing. At the time of this backing as well, they rotate so as to drag in grass growing in the front in terms of the travel direction (this refers to the travel direction at the time of the backing and thus is the back travel direction), as in the normal rotation state. Further, the ⅛ rotation (45-degree rotation) of both the right and left mowing blade groups 60A, 60B while the rotation direction in the reverse rotation state on the lower left in FIG. 14 is kept results in the state on the lower right in FIG. 14.

Since the right and left mowing blade groups 60A, 60B rotate so as to drag in the grass growing in the travel-direction front both in the case of the normal rotation state at the time when the mower 10 advances and in the case of the reverse rotation state at the time of backing when the mower 10 backs up (reverses) as described above, the overlap portions of the upper and lower mowing blades move in the same direction as illustrated in FIG. 15.

From the above, the left/right opposite rotation splitting mechanism 72 drives the rotation of the single mowing motor 70 to form a first overlapping state in which the tip portion of the upper mowing blade composing the right mowing blade group 60A and the tip portion of the lower mowing blade composing the left mowing blade group 60B overlap with each other, form a second overlapping state in which the tip portion of the lower mowing blade composing the right mowing blade group 60A and the tip portion of the upper mowing blade composing the left mowing blade group 60B overlap with each other, by normally or reversely rotating the two left and right mowing blade groups simultaneously by the inter-blade angle (90 degrees in this embodiment) from the first overlapping state, and alternately repeat these two overlapping states.

<Details of Control of Travel Speed>

In FIG. 16. the mower 10 includes: a remote controller 100 for user's remote operation, a receiving unit 110 that receives signals from the remote controller 100; a 3DG sensor 111 that measures three-axis acceleration; a control unit 120 that performs various controls over the mower 10; and a battery module 130 that supplies power to the mower 10. The receiving unit 110, the 3DG sensor 111, the control unit 120, and the battery module 130 are housed in the housing part 13 (see FIG. 1 and FIG. 2).

Figure 17:
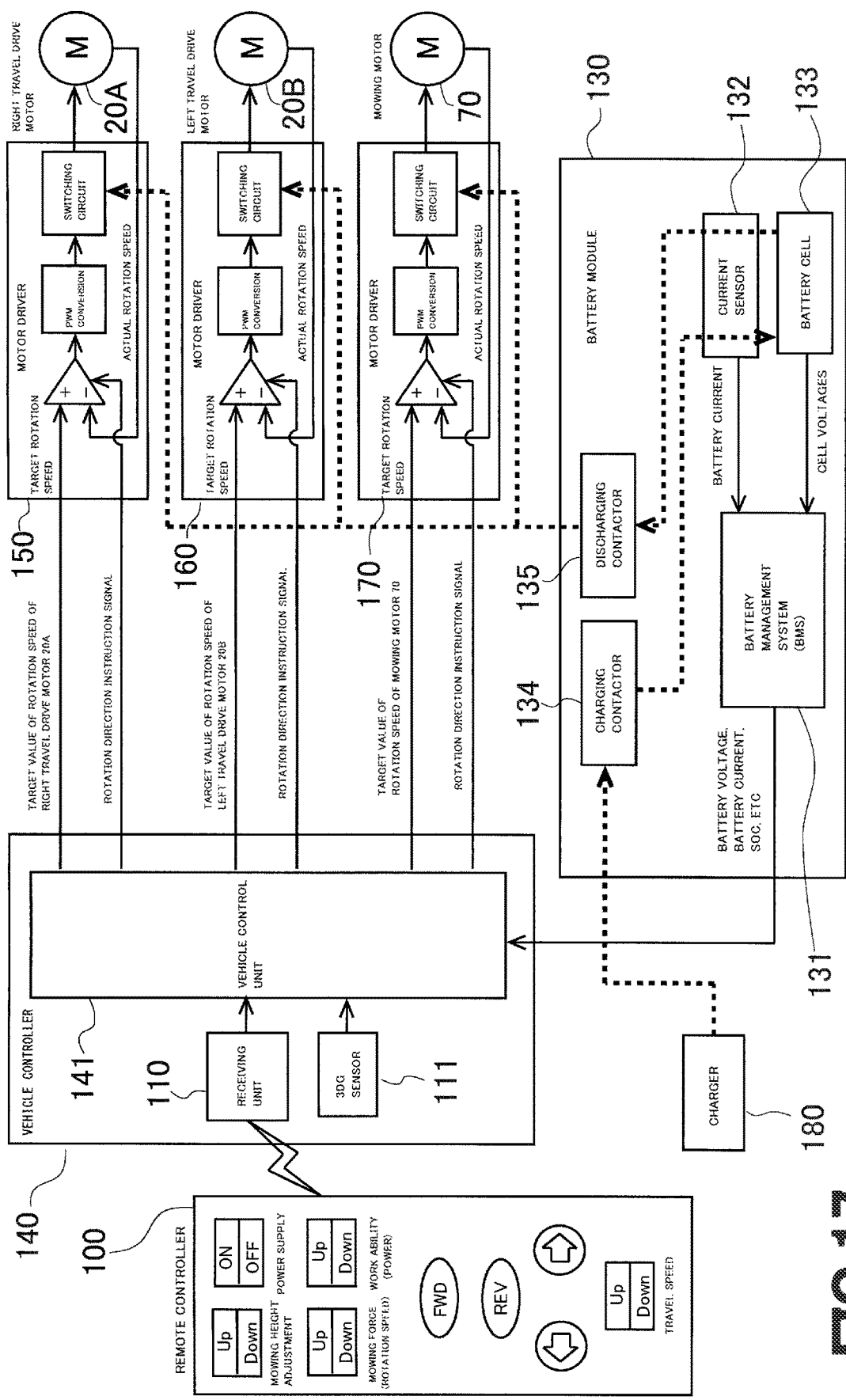
FIG. 17 is a detailed explanatory diagram of control in the embodiment.

In FIG. 17, the mover 10 includes: a vehicle controller 140 that controls the entire vehicle according to the user's operation through the remote controller 100; a motor driver 150 for the right travel drive motor 20A; a motor driver 160 for the left travel drive motor 20B; a motor driver 170 for the mowing motor 70; and a charger 180.

The vehicle controller 140 is constituted by a microcontroller (the number of its chips may be any), and this vehicle controller 140 internally has the receiving unit 110 constituted by a receiving circuit, the 3DG sensor 111, and a vehicle control unit 141. The vehicle control unit 141 includes an arithmetic processing unit and a storage unit (memory) that stores data, and it controls the entire vehicle based on the signals received by the receiving unit 110, the acceleration data measured by the 3DG sensor 111, and current and voltage data of the battery measured in the battery module 130.

In FIG. 16 and FIG. 17, the remote controller 100 is provided with a power ON/OFF button, a mowing height adjustment button for adjusting (Up/Down) the mowing height MH (see FIG. 15), a mowing force adjustment button for adjusting (Up/Down) the mowing force (the rotation speed of the mowing motor 70), a work ability adjustment button for adjusting (Up/Down) work ability (power), a forward button for moving the mower 10 forward (FWD), a reverse button for reversing (REV) the mower 10, a right button for moving the mower 10 in the right direction (→), a left button for moving the mower 10 in the left direction (←), and a travel speed adjustment button for adjusting (Up/Down) the travel speed (the maximum rotation speed of the travel drive motors 20A, 20B).

In FIG. 16, the control unit 120 includes a travel control unit 121, a mowing control unit 122, and a posture monitor and control unit 123.

The travel control unit 121 is composed of the vehicle control unit 141 (see FIG. 17) in the vehicle controller 140 and the motor drivers 150, 160 (see FIG. 17) for the travel drive motors 20A, 20B, and executes travel-related controls. Specifically, it performs processing for accepting a power consumption set value (Pc), the maximum rotation speed (Rmax) of the travel drive motors 20A, 20B, and a signal indicating advancing or backing, all of which are transmitted from the remote controller 100 in response to the user's operation and received by the receiving unit 110, and stores them in the memory. The travel control unit 121 further controls the rotation speed and the rotation directions of the travel drive motors 20A, 20B (see FIG. 18). Note that the rotation directions are decided according to the signal indicating a user's instruction for advancing or backing. Further, the user's operation of the right button or the left button is also reflected in the travel control, but since this is not directly involved in the control contents of the present application, a description thereof will be omitted.

The mowing control unit 122 is composed of the vehicle control unit 141 (see FIG. 17) in the vehicle controller 140 and the motor driver 170 for the mowing motor 70 (see FIG. 17), and executes controls regarding the mowing work. Specifically, it performs processing for accepting the setting signals of the target rotation speed (Rmc) of the mowing motor 70 and the mowing height (MH) and the signal indicating advancing or reversing, all of which are transmitted from the remote controller 100 in response to the user's operation and received by the receiving unit 110, and stores them in the memory. The processing for accepting the signal indicating advancing or backing and its storage in the memory are also described in the above description of the travel control unit 121, but since the same processing is not executed repeatedly and they relate to the controls by both, the processing and storage by the mowing control unit 122 will also be described. Specifically, switching from advancing to backing or from backing to advancing also results in the switching of the rotation of the mowing motor 70 from the normal rotation state to the reverse rotation state or from the reverse rotation state to the normal rotation state. The mowing control unit 122 also controls the rotation speed and the rotation direction of the mowing motor 70 (see FIG. 18). As described above, the rotation direction is decided according to the signal indicating advancing or backing and is linked with the control by the travel control unit 121. The mowing control unit 122 further adjusts the mowing height. In this mowing height adjustment, it drives the mowing height adjustment motor 80 according to the signal of the mowing height (MH) set by the user to cause the mowing height adjusting mechanism 85 to adjust the height position of the right and left mowing blade groups 60A, 60B.

The posture monitor and control unit 123 is composed of the vehicle control unit 141 (see FIG. 17) in the vehicle controller 140 and monitors and controls the vehicle posture. Specifically, the posture monitor and control unit 123 determines the posture of the vehicle (the entire mower 10), that is, calculates its inclination angle, using component values of the gravitational acceleration measured by the 3DG sensor 111 (3-axis acceleration sensor) installed in the vehicle controller 140, compares the inclination angle obtained through the calculation with a preset threshold value to determine whether or not the vehicle's posture has a margin or determine a degree of the margin, and outputs the determination result from the indicator 90. As for the output of the indicator 90, after it is determined whether or not the posture has a risk, red lighting or red blinking may be output, for instance, when the risk determination turns out that the posture has a risk, or after the stepwise determination of no risk, risk, high risk, and the like, the determination result may be notified by, for example, lighting or blinking in green, yellow, red, or the like. Consequently, in the case where the contact surface (ground) where the mowing work is performed is a slope, when the margin to a mowable inclination decreases, this state can be notified to the user by the output of the indicator 90. Therefore, even in the case where the user operates the remote controller 100 at a place distant from the main body of the mower 10, a safe operation is enabled. Note that the risk may be warned by sound in addition to the output of the indicator 90. Another possible configuration is to transmit a signal indicating the determination result to the remote controller 100 to make the remote controller 100 perform outputting or sound warning corresponding to the output by the indicator 90.

In FIG. 17, the battery module 130 includes a battery management system (BMS) 131, a current sensor 132, a battery cell 133, a charging contactor 134, and a discharging contactor 135. The battery management system (BMS) 131 sends a battery current (a discharge current flowing from the battery cell 133 to the discharging contactor 135) measured by the current sensor 132, a battery voltage obtained from cell voltages measured in the battery cell 133, the battery remaining capacity (SOC), and so on to the vehicle control unit 141 in the vehicle controller 140. The charging contactor 134 controls a current flowing from the charger 180 to the battery cell 133 by opening/closing, and the discharging contactor 135 controls the currents flowing from the battery cell 133 to the motor drivers 150, 160, 170 by opening/closing. The charger 180 may be one that is connectable to a household power supply.

The motor driver 150 for the right travel drive motor 20A and the motor driver 160 for the left travel drive motor 20B perform PWM·Duty control for maintaining the target rotation speed of the travel drive motors 20A, 20B. PWM (Pulse Width Modulation) modulates pulse width, and the PWM control controls output power by repeatedly switching ON/OFF of the pulse. Specifically, it performs feedback control of PWM-converting a difference between the target rotation speed and the actual rotation speed of the travel drive motors 20A, 20B to input the result to a switching circuit, rotating the travel drive motors 20A, 20B according to an output from the switching circuit, feeding back a new actual rotation speed of the travel drive motors 20A, 20B, finding again a difference between the target rotation speed and the actual rotation speed, and PWM-converting the difference to input the result to the switching circuit. The switching circuit is supplied with power through the discharging contactor 135. The travel drive motors 20A, 20B are, for example, brushless DC motors. In the PWM conversion of the difference between the target rotation speed and the actual rotation speed, a rotation direction instruction signal corresponding to the switching to/from advancing from/to backing is also taken into consideration.

The motor driver 170 for the mowing motor 70 similarly performs PWM·Duty control for maintaining the target rotation speed of the mowing motor 70. Specifically, it performs feedback control of PWM-converting a difference between the target rotation speed and the actual rotation speed of the mowing motor 70 to input the result to a switching circuit, rotating the mowing motor 70 according to an output from the switching circuit, feeding back a new actual rotation speed of the mowing motor 70, finding again a difference between the target rotation speed and the actual rotation speed, and PWM-converting the difference to input the result to the switching circuit. The switching circuit is supplied with power through the discharging contactor 135. The mowing motor 70 is, for example, a brushless DC motor. In the PWM conversion of the difference between the target rotation speed and the actual rotation speed, a rotation direction instruction signal corresponding to the switching from/to the normal rotation state to/from the reverse rotation state accompanying the switching from/to advancing to/from backing is also taken into consideration.

Figure 18:
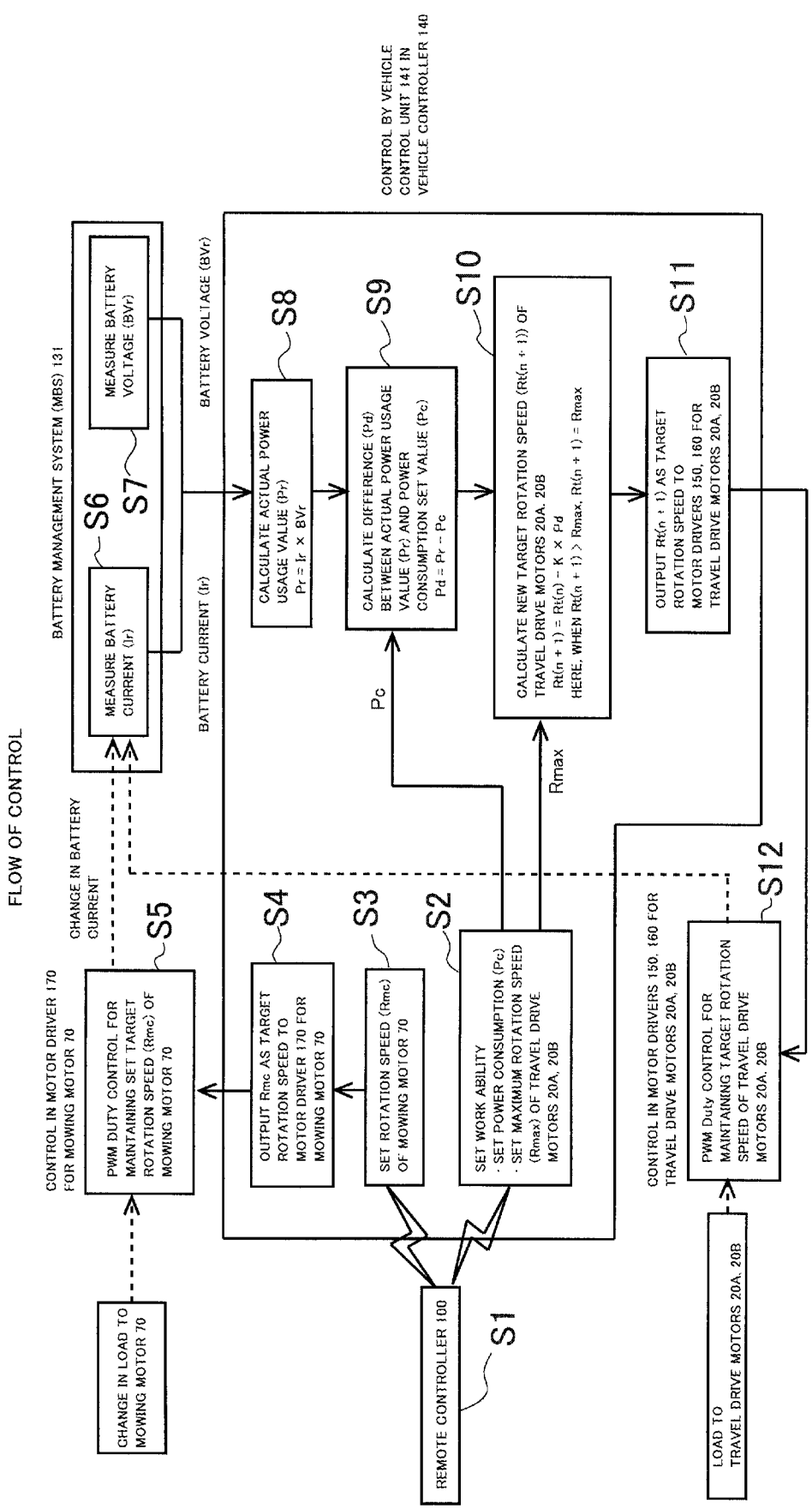
FIG. 18 is a drawing of a flowchart showing the flow of the control in the embodiment.

The flowchart in FIG. 18 illustrates the flow of the controls (the controls by the travel control unit 121 and the mowing control unit 122). In FIG. 18, the user first operates the remote controller 100 to input the mowing force (the rotation speed (Rmc) of the mowing motor 70), the work ability (power consumption (Pc)), and the travel speed (the maximum rotation speed (Rmax) of the travel drive motors 20A, 20B) (step S1).

Next, since the signals and data input by the user are wirelessly transmitted from the remote controller 100 to the receiving unit 110 in the vehicle controller 140, these signals and data are received by the receiving unit 110, accepted by the vehicle control unit 141 in the vehicle controller 140, and stored in the memory (it may be a volatile memory or a nonvolatile memory). Consequently, the work ability is set, that is, the power consumption (Pc) is set, and the maximum rotation speed (Rmax) of the travel drive motors 20A, 20B is set (step S2), and the rotation speed (Rmc) of the mowing motor 70 is set (step S3).

Subsequently, the vehicle control unit 141 in the vehicle controller 140 outputs the set rotation speed (Rmc) of the mowing motor 70 as the target rotation speed to the motor driver 170 for the mowing motor 70 (see FIG. 17) (step S4).

Then, in the motor driver 170 for the mowing motor 70, the PWM·Duty control for maintaining the set target rotation speed (Rmc) of the mowing motor 70 is executed (step S5). At this time, the load to the mowing motor 70 varies because of a change in the amount of grass or other reasons, resulting in a change in power consumed by the mowing motor 70. That is, the power supplied to the switching circuit in the motor driver 170 for the mowing motor 70 changes (current changes if voltage is constant). For example, an increase in the amount of grass results in an increase in the load to the mowing motor 70 to increase the power consumed by the mowing motor 70. That is, the power supplied to the switching circuit increases. On the other hand, a decrease in the amount of grass results in a decrease in the load to the mowing motor 70 to decrease the power consumed by the mowing motor 70. That is, the power supplied to the switching circuit decreases.

Then, in the battery module 130, the current sensor 132 measures a battery current Ir (discharge current flowing from the battery cell 133 to the discharging contactor 135 (step S6), and a battery voltage BVr is obtained from the cell voltages measured in the battery cell 133 (step S7), and accordingly, the battery management system (BMS) 131 sends the battery current Ir and the battery voltage BVr to the vehicle control unit 141 in the vehicle controller 140.

Subsequently, the vehicle control unit 141 in the vehicle controller 140 calculates the actual power usage value Pr by using the battery current Ir and the battery voltage BVr (step S8). For this calculation processing, the formula $Pr=Ir \times BVr$ is used.

Then, the vehicle control unit 141 calculates the difference (Pd) between the actual power usage value Pr and the power consumption set value Pc (step S9). For this calculation processing, the formula $Pd=Pr-Pc$ is used.

Thereafter, the vehicle control unit 141 calculates a new target rotation speed $Rt(n+1)$ of the travel drive motors 20A, 20B (step S10). For this calculation processing, the formula $Rt(n+1)=Rt(n)-K \times Pd$ is used. Here, K is a proportional constant, and this formula is a relational formula indicating that the difference Pd between the actual power usage value Pr and the power consumption set value Pc is proportional to the difference $(Rt(n+1)-Rt(n))$ between the new and old values of the target rotation speed of the travel drive motors 20A, 20B. This proportional constant K is found from experiments. Note that instead of such a proportional relational formula, a quadratic or higher-order function may be used, or the correspondence relationship may be decided using a table (a table stored in the memory of the vehicle control unit 141).

Note that in step 10, Rt(n+1)=Rmax in the case of Rt(n+1)>Rmax. That is, when the new target rotation speed Rt(n+1) of the travel drive motors 20A, 20B obtained based on the difference Pd between the actual power usage value Pr and the power consumption set value Pc exceeds the set maximum rotation speed Rmax of the travel drive motors 20A, 20B, the maximum rotation speed Rmax is set as the new target rotation speed Rt(n+1).

For example, when the amount of grass increases to increase the load to the mowing motor 70 and increase the power consumed by the mowing motor 70, that is, when the power supplied to the switching circuit increases, the battery current Ir increases and the actual power usage value Pr increases. Therefore, since the difference between the actual power usage value Pr and the power consumption set value Pc, that is, Pd=Pr−Pc has a plus value, setting the proportional constant K to a plus value results in that "−K×Pd" has a minus value, and accordingly, the new target rotation speed Rt(n+1) becomes lower than the previous target rotation speed Rt(n), so that correction to lower the travel speed is made.

Subsequently, the vehicle control unit 141 outputs Rt(n+1) as the target rotation speed to the motor drivers 150, 160 for the travel drive motors 20A, 20B (step S11).

Then, in the motor drivers 150, 160 for the travel drive motors 20A, 20B, the PWM·Duty control for maintaining the target rotation speed of the travel drive motors 20A, 20B is performed (step S12). At this time, when the load to the travel drive motors 20A, 20B varies, the power consumed by the travel drive motors 20A, 20B changes. That is, the power supplied to the switching circuit in the motor drivers 150, 160 for the travel drive motors 20A, 20B changes (current changes if voltage is constant). Therefore, this power change (current change) is reflected in the processing in steps S6, S7 previously described.

Figure 19:
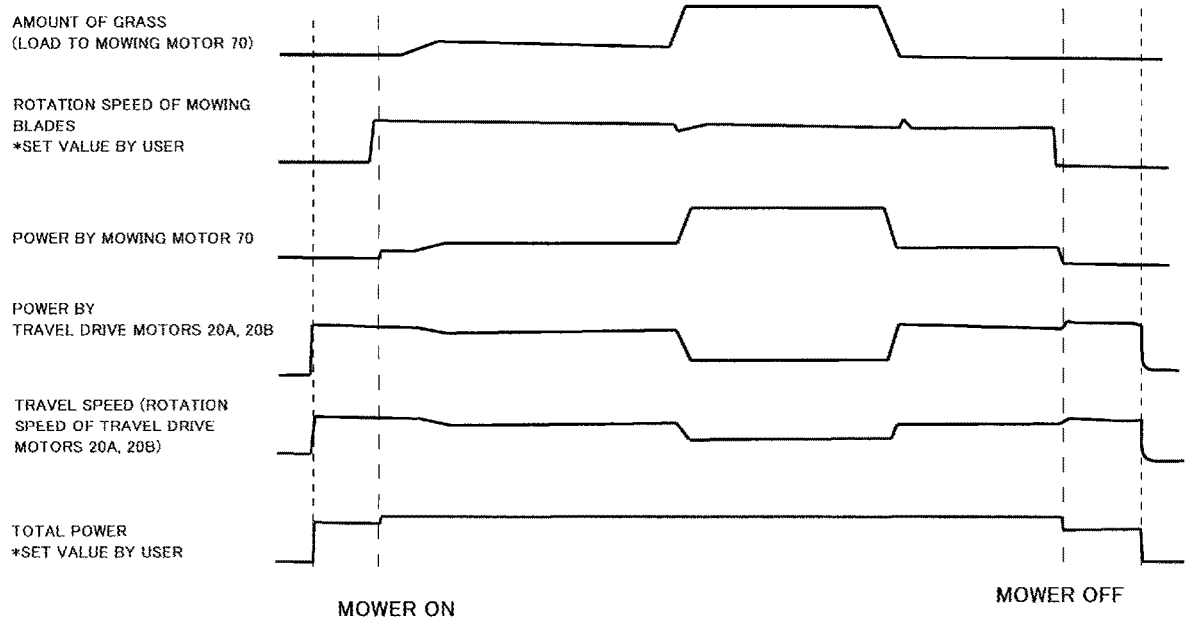
FIG. 19 is a drawing of graphs showing changes in data involved in the control in the embodiment.

FIG. 19 illustrates graphs showing changes in the data involved in the controls in FIG. 18 described above. The rotation speed of the mowing blades and the total power are kept constant at values set by the user. It is seen that, at this time, as the amount of grass (load to the mowing motor 70) increases, the power by the mowing motor 70 increases, the travel speed (the rotation speed of the travel drive motors 20A, 20B) lowers, and the power by the travel drive motors 20A, 20B also decreases.

<Effects of This Embodiment>

This embodiment as configured above has the following effects. That is, in the mower 10, when the load to the mowing motor 70 varies as the amount of grass increases/decreases, the rotation speed of the travel drive motors 20A, 20B is controlled, that is, the travel speed is controlled such that the total power equal to the sum of the power consumed by the mowing motor 70 and the power consumed by the travel drive motors 20A, 20B becomes constant. Consequently, since the total power during the work becomes constant, it is possible to perform the mowing work while predicting the consumption rate of the battery, a change in its remaining capacity, the workable time from the state where the battery is fully charged, or the time when to replace the battery.

Further, the use of the proportional relational formula (see step S10 in FIG. 18) for the control by the vehicle control unit 141 makes it possible to easily calculate the new target rotation speed Rt(n+1) of the travel drive motors 20A, 20A.

Further, in the above-described control (the processing in step S10 in FIG. 18), when the new target rotation speed Rt(n+1) of the travel drive motors 20A, 20B obtained based on the difference Pd between the actual power usage value Pr and the power consumption set value Pc exceeds the set maximum rotation speed Rmax of the travel drive motors 20A, 20B, the maximum rotation speed Rmax is set as the new target rotation speed Rt(n+1), making it possible to more appropriately control the travel speed. Specifically, when the amount of grass is small, the power consumed by the mowing motor 70 decreases and thus the power consumed by the travel drive motors 20A, 20B can be increased and the target rotation speed of the travel drive motors 20A, 20B can also be increased, but even in this case, the set maximum rotation speed Rmax of the travel drive motors 20A, 20B is set as the upper limit value, making it possible to prevent the travel speed from becoming excessively high. In this case, the power consumed by the travel drive motors 20A, 20B is held low, resulting in a decrease in the total power, which is a change to make the battery last longer and thus is not inconvenient for the user.

Further, since the mowing mechanism unit 74 is configured to use the single mowing motor 70 to simultaneously rotate, in the opposite directions, the two right and left mowing blade groups 60A, 60B each including an even number of (four in this embodiment) of the upper and lower mowing blades arranged at different height positions, it is possible to perform the mowing work efficiently. Further, since the left/right opposite rotation splitting mechanism 72 is capable of reversing the rotation directions of the two mowing blade groups 60A, 60B from the normal rotation state to the reverse rotation state or from the reverse rotation state to the normal rotation state as the travel direction is switched from forward to backward or from backward to forward, it is possible to efficiently perform the mowing work by switching advancing and backing by the switchback method without turning around the mower 10 itself on a slope.

Further, since the two plate-shaped members with the same shape are connected in the cross shape with one of the two plate-shaped members being turned inside out, to form the mowing blade group 60A, 60B including the four mowing blades 61A to 64A, 61B to 64B, it is possible to easily manufacture the mowing blade groups 60A, 60B.

Further, since the crawler belts 30A, 30B include a large number of the rubber-made spike-shaped blocks 40 having the three-dimensional convex portions 41, the convex portions 41 achieve the point-contact with the ground, enabling quiet and stable traveling.

Further, the blocks 40 are provided with the first and second skid blocking surfaces 44, 47 on both the left and right sides, it is possible to prevent the mower 10 from skidding when the mowing work is performed on a slope. This together with the effect of achieving the advancing/backing switching by the switchback method makes it possible to efficiently perform the mowing work by a safe and simple operation without any slipping down due to the inclination.

Further, since the mower 10 is provided with the indicator 90, even when the user operates the remote controller 100 at a place distant from the main body of the mower 10, safe operation is enabled.

Moreover, since the mower 10 is provided with the mowing height adjusting mechanism 85, it is possible to perform the mowing work according to the situation and in addition, even in a narrow place, it is possible to perform the mowing work by sticking out the mowing blade groups 60A, 60B forward.

Further, since the rotary driving of the mowing blades is performed by the electric mowing motor 70 and the battery module 130 is provided with the discharging contactor 135, by monitoring the drive current thereof, it is possible to stop the driving in an instant when the mowing blades hit against hard objects such as stones.

<Modification Modes>

It should be noted that the present invention is not limited to the above-described embodiment, and modifications and so on within the scope that achieves the object of the present invention is included in the present invention.

Figure 20:
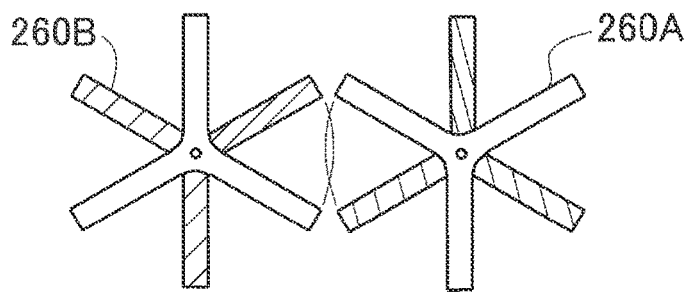
FIG. 20 is a view illustrating a first modification mode of the present invention.

For example, in the above-described embodiment, the mowing blade groups 60A, 60B each include the four mowing blades 61A to 64A, 61B to 64B, but they may be replaced by, for example, mowing blade groups 260A, 260B (inter-blade angle=60 degrees) each including six mowing blades as illustrated in FIG. 20, and in short, any mowing blade group may be used as long as it includes a four or more even number of mowing blades.

Figure 21:
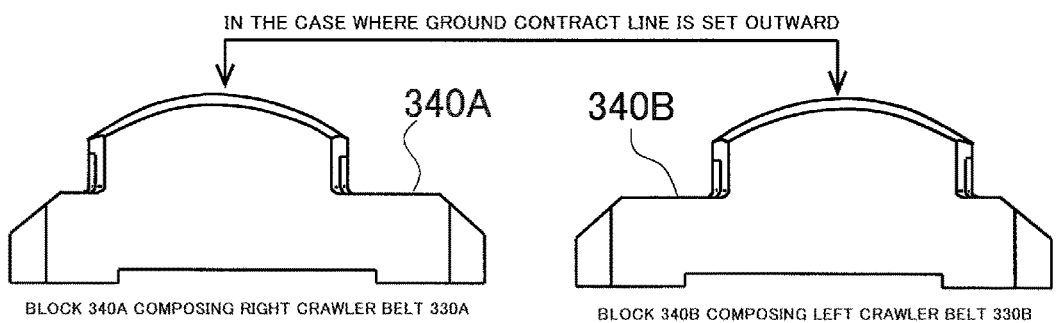
FIG. 21 is a view illustrating a second modification mode of the present invention.

Further, in the above-described embodiment, the blocks 40 each have a laterally symmetrical shape, but they may be replaced by blocks 340A, 340B having an asymmetrical shape as illustrated in FIG. 21. In such a configuration, in the case where the ground contact line is set more outward than in the above-described embodiment, the blocks 340A composing a right crawler belt 330A (not illustrated) and the blocks 340B composing a left crawler belt 330B (not illustrated) may be arranged as illustrated in FIG. 21, and the ground contact line may be set more inward than in the above-described embodiment.

Moreover, in the above-described embodiment, the blocks 40 have the first and second skid blocking surfaces 44, 47, but may have third, fourth, . . . skid blocking surfaces to have a staircase shape with three steps or more. In this case, the height dimensions of the skid blocking surfaces are preferably 6 mm or more. Further, it is preconditioned that the spaces on the right of the right skid blocking surfaces and the spaces on the left of the left skid blocking surfaces are open.

INDUSTRIAL APPLICABILITY

As described above, the mower of the present invention is suitable for use in mowing grass growing on various grounds such as slopes and rough grounds, for instance.

EXPLANATION OF REFERENCE SIGNS

10 mower
20A, 20B travel drive motor
30A, 30B crawler belt
31 belt base
40, 340A, 340B block
41 convex portion
42 front slope
44 first skid blocking surface
45 intermediate shelf surface
47 second skid blocking surface
49 mounting surface
60A, 60B, 260A, 260B mowing blade group
61A to 64A, 61B to 64B mowing blade
70 mowing motor
72 left/right opposite rotation splitting mechanism
120 control unit
130 battery module
132 current sensor
141 vehicle control unit in vehicle controller composing control unit
150, 160, 170 motor driver composing control unit

The invention claimed is:

1. A mower equipped with a mowing motor for rotating mowing blades and a travel drive motor for self-propelling, the mower comprising:
   a crawler belt that is driven by the travel drive motor and constitutes an endless belt;
   a battery that supplies power to the mowing motor and the travel drive motor;
   a current sensor that measures a current value of the battery; and
   a control unit that accepts a target rotation speed of the mowing motor and power consumption that are set and input by a user, and while maintaining the set target rotation speed of the mowing motor, finds an actual power usage value that varies according to variation in load to the mowing motor accompanying an increase or a decrease in an amount of grass, by using the current value of the battery measured by the current sensor, and calculates a new target rotation speed of the travel drive motor from a difference between the found actual power usage value and a set value of the power consumption to thereby control a travel speed to make the actual power usage value fall within the set value of the power consumption.

2. The mower according to claim 1,
   wherein the control unit calculates the new target rotation speed of the travel drive motor by using a relational formula indicating that the difference between the actual power usage value and the set value of the power consumption is proportional to a difference between new and old values of the target rotation speed of the travel drive motor.

3. The mower according to claim 1,
   wherein the control unit
   accepts an input of a set maximum rotation speed of the travel drive motor in addition to the user-set values of the target rotation speed of the mowing motor and the power consumption, and
   sets the maximum rotation speed of the travel drive motor as the new target rotation speed of the travel drive motor when the new target rotation speed of the travel drive motor calculated from the difference between the actual power usage value and the set value of the power consumption exceeds the set maximum rotation speed of the travel drive motor.

4. The mower according to claim 1, comprising
   two left and right mowing blade groups that rotate simultaneously, wherein the mowing blade groups are each composed of a four or more even number of the mowing blades arranged radially from a rotation center, an even number of the mowing blades include upper mowing blades and lower mowing blades, with height positions of the former and the latter being different, and the mowing blade groups each have the upper mowing blades and the lower mowing blades arranged alternately at equal inter-blade angle intervals, and
   the mower comprising a left/right opposite rotation splitting mechanism that performs rotation transmission in a left/right splitting manner into opposite rotations, to cause the two left and right mowing blade groups to rotate in opposite directions when transmitting the rotation of the single mowing motor to the two left and right mowing blade groups, and reverses rotation directions of the two left and right mowing blade groups from a normal rotation state to a reverse rotation state or from the reverse rotation state to the normal rotation state as a travel direction is switched from forward to backward or from backward to forward, wherein the left/right opposite rotation splitting mechanism forms a first overlapping state in which a tip portion of the upper mowing blade composing the right mowing blade group and a tip portion of the lower mowing blade composing the left mowing blade group overlap with each other, forms a second overlapping state in which a tip portion of the lower mowing blade composing the right mowing blade group and a tip portion of the upper mowing blade composing the left mowing blade group overlap with each other, by normally rotating or reversely rotating the two left and right mowing blade groups simultaneously by the inter-blade angle from the first overlapping state, and alternately repeats the two overlapping states.

5. The mower according to claim 4,
wherein the mowing blade groups are each composed of four pieces of the mowing blades arranged at the inter-blade angle intervals, the inter-blade angle being 90 degrees, and
wherein out of the four mowing blades, two pieces of the upper mowing blades making 180 degrees are formed of one continuous plate-shaped member and two pieces of the lower mowing blades making 180 degrees are also formed of one continuous plate-shaped member, and the mowing blade groups are each formed of the two plate-shaped members with the same shape connected in a cross shape with one of the two plate-shaped members being turned inside out.

6. The mower according to claim 1,
wherein the crawler belt includes
a flexible belt base wound around a plurality of wheels including a drive wheel and a guide wheel; and a large number of rubber-made spike-shaped blocks mounted on an outer peripheral side of the belt base, and
wherein the blocks each include:
a three-dimensional convex portion all of whose cross sections perpendicular to a mounting surface to the belt base have a convex shape drawn with a smooth line;
a front slope that is formed by cutting the convex portion slantingly from a top of the convex portion or a portion near the top and is a travel-direction front surface in a ground contact state; and
left and right skid blocking surfaces formed by cutting the convex portion vertically or substantially vertically from positions apart leftward and rightward from the top.

7. The mower according to claim 6,
wherein the left and right skid blocking surfaces formed by cutting the convex portion vertically or substantially vertically from the positions apart leftward and rightward from the top are first skid blocking surfaces, and
wherein, in addition to the convex portion, the front slope, and the left and right first skid blocking surfaces, the blocks each include: left and right intermediate shelf surfaces that are formed in parallel or substantially in parallel to the mounting surface to the belt base while intersecting with the first skid blocking surfaces; and left and right second skid blocking surfaces formed vertically or substantially vertically at positions closer to left and right ends than the intermediate shelf surfaces.

* * * * *